US012726632B2

(12) United States Patent
Lim

(10) Patent No.: US 12,726,632 B2
(45) Date of Patent: Sep. 1, 2026

(54) IMAGE ENCODING/DECODING METHOD AND APPARATUS

(71) Applicant: KT CORPORATION, Gyeonggi-do (KR)

(72) Inventor: Sung Won Lim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 106 days.

(21) Appl. No.: 18/724,448

(22) PCT Filed: Dec. 23, 2022

(86) PCT No.: PCT/KR2022/021199

§ 371 (c)(1),
(2) Date: Jun. 26, 2024

(87) PCT Pub. No.: WO2023/128489

PCT Pub. Date: Jul. 6, 2023

(65) Prior Publication Data

US 2025/0227245 A1 Jul. 10, 2025

(30) Foreign Application Priority Data

Dec. 28, 2021 (KR) ........................ 10-2021-0190260

(51) Int. Cl.
*H04N 19/159* (2014.01)
*H04N 19/176* (2014.01)

(52) U.S. Cl.
CPC ......... *H04N 19/159* (2014.11); *H04N 19/176* (2014.11)

(58) Field of Classification Search
None
See application file for complete search history.

(56) References Cited

U.S. PATENT DOCUMENTS 11,218,726 B2 * 1/2022 Lee ...................... H04N 19/573
11,323,705 B2 * 5/2022 Lee ...................... H04N 19/117
11,528,505 B2 * 12/2022 Kim ..................... H04N 19/593
(Continued)

FOREIGN PATENT DOCUMENTS

KR 10-2018-0015598 A 2/2018
KR 10-2018-0041575 A 4/2018
(Continued)

OTHER PUBLICATIONS

Korean Intellectual Property Office, International Search Report of International Application No. PCT/KR2022/021199, Mar. 24, 2023.
(Continued)

*Primary Examiner* — Mohammad J Rahman
(74) *Attorney, Agent, or Firm* — IP Legal Services, LLC

(57) ABSTRACT

An image encoding/decoding method and apparatus according to the present invention may: determine an intra prediction mode of a current block; determine one or more reference lines of the current block from among a plurality of reference line candidates available for the current block; generate a prediction sample of the current block on the basis of the intra prediction mode and the one or more reference lines, which have been determined; and correct the generated prediction sample.

11 Claims, 13 Drawing Sheets

(56) References Cited

U.S. PATENT DOCUMENTS

2015/0350640 A1* 12/2015 Jeong .................. H04N 19/593 375/240.12
2016/0277762 A1* 9/2016 Zhang .................. H04N 19/593
2019/0379891 A1 12/2019 Moon et al.
2021/0021832 A1 1/2021 Lee
2021/0092397 A1* 3/2021 Kim .................. H04N 19/176
2021/0120237 A1* 4/2021 Filippov .................. H04N 19/11
2021/0120241 A1* 4/2021 Filippov .................. H04N 19/82
2021/0281853 A1 9/2021 Moon et al.
2021/0281854 A1 9/2021 Moon et al.
2021/0337196 A1* 10/2021 Lee .................. H04N 19/463
2021/0360240 A1* 11/2021 Lee .................. H04N 19/625
2021/0392339 A1 12/2021 Lim
2021/0392371 A1 12/2021 Lee et al.
2022/0007016 A1* 1/2022 Lee .................. H04N 19/176
2022/0007035 A1* 1/2022 Lee .................. H04N 19/60
2022/0014743 A1* 1/2022 Lee .................. H04N 19/61
2022/0103863 A1* 3/2022 Lee .................. H04N 19/176
2022/0109835 A1* 4/2022 Lee .................. H04N 19/176
2022/0337814 A1* 10/2022 Heo .................. H04N 19/117
2023/0073580 A1 3/2023 Moon et al.
2023/0101636 A1 3/2023 Moon et al.
2023/0109828 A1 4/2023 Lee et al.
2023/0353742 A1 11/2023 Lee
2024/0163474 A1 5/2024 Lee et al.

FOREIGN PATENT DOCUMENTS

KR 10-2019-0110041 A 9/2019
KR 10-2020-0041801 A 4/2020
KR 10-2021-0153547 A 12/2021

OTHER PUBLICATIONS

Korean Intellectual Property Office, Written Opinion of International Application No. PCT/KR2022/021199, Mar. 24, 2023.

* cited by examiner

100
Current picture
110
Picture partitioning module
Prediction target block
120
Inter prediction module
125
Intra prediction module
Residual block
130
Transform module
135
Quantization module
160
Rearrangement module
165
Entropy encoding module
NAL
140
Inverse quantization module
145
Inverse transform module
Reconstructed residual block
150
Filter module
155
Memory

REFERENCE SAMPLE

PREDICTION SAMPLE

REFERENCE SAMPLE

IMAGE ENCODING/DECODING METHOD AND APPARATUS

CROSS REFERENCE TO RELATED APPLICATIONS

This application is a National Stage Patent Application of PCT International Patent Application No. PCT/KR2022/021199 (filed on Dec. 23, 2022) under 35 U.S.C. § 371, which claims priority to Korean Patent Application No. 10-2021-0190260 (filed on Dec. 28, 2021), the teachings of which are incorporated herein in their entireties by reference.

TECHNICAL FIELD

The present disclosure relates to a method and a device for processing an image signal.

BACKGROUND ART

Recently, demands for high-resolution and high-quality images such as HD (High Definition) images and UHD (Ultra High Definition) images have increased in a variety of application fields. As image data becomes high-resolution and high-quality, the volume of data relatively increases compared to the existing image data, so when image data is transmitted by using media such as the existing wire and wireless broadband circuit or is stored by using the existing storage medium, expenses for transmission and expenses for storage increase. High efficiency image compression technologies may be utilized to resolve these problems which are generated as image data becomes high-resolution and high-quality.

There are various technologies such as an inter prediction technology which predicts a pixel value included in a current picture from a previous or subsequent picture of a current picture with an image impression technology, an intra prediction technology which predicts a pixel value included in a current picture by using pixel information in a current picture, an entropy encoding technology which assigns a short sign to a value with high appearance frequency and assigns a long sign to a value with low appearance frequency and so on, and image data may be effectively compressed and transmitted or stored by using these image compression technologies.

On the other hand, as demands for a high-resolution image have increased, demands for stereo-scopic image contents have increased as a new image service. A video compression technology for effectively providing high-resolution and ultra high-resolution stereo-scopic image contents has been discussed.

DISCLOSURE

Technical Problem

The purpose of the present disclosure is to provide an intra prediction method and device in encoding/decoding an image signal.

The purpose of the present disclosure is to provide a method and a device for determining a reference line for intra prediction in encoding/decoding an image signal.

The purpose of the present disclosure is to provide a method and a device for encoding an intra prediction mode in encoding/decoding an image signal.

The purpose of the present disclosure is to provide a method and a device for correcting a prediction sample according to intra prediction in encoding/decoding an image signal.

Technical effects of the present disclosure may be non-limited by the above-mentioned technical effects, and other unmentioned technical effects may be clearly understood from the following description by those having ordinary skill in the technical field to which the present disclosure pertains.

Technical Solution

An image decoding method and device according to the present disclosure may determine an intra prediction mode of a current block, determine one or more reference lines of the current block among a plurality of reference line candidates available for the current block, generate a prediction sample of the current block based on the intra prediction mode and the one or more reference lines which have been determined and correct the generated prediction sample to generate a corrected prediction sample.

In an image decoding method and device according to the present disclosure, when an intra prediction mode of the current block is a non-directional mode, the prediction sample may be corrected based on a difference between at least two reference samples belonging to the one or more reference lines.

In an image decoding method and device according to the present disclosure, the difference may include at least one of a first difference between a left reference sample of the current block and a reference sample at a reference position or a second difference between a top reference sample of the current block and a reference sample at the reference position.

In an image decoding method and device according to the present disclosure, the corrected prediction sample may be generated based on a weighted sum of the prediction sample, the first difference and the second difference.

In an image decoding method and device according to the present disclosure, when an intra prediction mode of the current block is a directional mode, the corrected prediction sample may be generated based on a difference between at least two reference samples belonging to the one or more reference lines.

In an image decoding method and device according to the present disclosure, the at least two reference samples may include a first reference sample having the same x-coordinate or y-coordinate as the prediction sample and a second reference sample at a projected position from the first reference sample according to a prediction direction according to an intra prediction mode of the current block.

In an image decoding method and device according to the present disclosure, a position of the first reference sample may be determined based on an intra prediction mode of the current block.

In an image decoding method and device according to the present disclosure, the corrected prediction sample may be generated based on a weighted sum of a difference between the prediction sample and the at least two reference samples.

In an image decoding method and device according to the present disclosure, a weight for the weighted sum may be determined based on a cost calculated from a predetermined template region adjacent to the current block.

In an image decoding method and device according to the present disclosure, the cost may be calculated for each of a plurality of candidate modes included in a candidate list of the current block.

In an image decoding method and device according to the present disclosure, a weight for the weighted sum may be determined based on a comparison between the determined intra prediction mode and an intra prediction mode derived based on the cost.

In an image decoding method and device according to the present disclosure, a plurality of reference lines may be used to correct a prediction sample of the current block.

In an image decoding method and device according to the present disclosure, any one of the plurality of reference lines is a reference line used to generate a prediction sample of the current block, and another one of the plurality of reference lines may be specified based on information signaled through a bitstream.

An image encoding method and device according to the present disclosure may determine an intra prediction mode of a current block, determine one or more reference lines of the current block among a plurality of reference line candidates available for the current block, generate a prediction sample of the current block based on the intra prediction mode and the one or more reference lines which have been determined and correct the generated prediction sample to generate a corrected prediction sample.

In an image encoding method and device according to the present disclosure, when an intra prediction mode of the current block is a non-directional mode, the prediction sample may be corrected based on a difference between at least two reference samples belonging to the one or more reference lines.

In an image encoding method and device according to the present disclosure, the difference may include at least one of a first difference between a left reference sample of the current block and a reference sample at a reference position or a second difference between a top reference sample of the current block and a reference sample at the reference position.

In an image encoding method and device according to the present disclosure, the corrected prediction sample may be generated based on a weighted sum of the prediction sample, the first difference and the second difference.

In an image encoding method and device according to the present disclosure, when an intra prediction mode of the current block is a directional mode, the corrected prediction sample may be generated based on a difference between at least two reference samples belonging to the one or more reference lines.

In an image encoding method and device according to the present disclosure, the at least two reference samples may include a first reference sample having the same x-coordinate or y-coordinate as the prediction sample and a second reference sample at a projected position from the first reference sample according to a prediction direction according to an intra prediction mode of the current block.

In an image encoding method and device according to the present disclosure, a position of the first reference sample may be determined based on an intra prediction mode of the current block.

In an image encoding method and device according to the present disclosure, the corrected prediction sample may be generated based on a weighted sum of a difference between the prediction sample and the at least two reference samples.

In an image encoding method and device according to the present disclosure, a weight for the weighted sum may be determined based on a cost calculated from a predetermined template region adjacent to the current block.

In an image encoding method and device according to the present disclosure, the cost may be calculated for each of a plurality of candidate modes included in a candidate list of the current block.

In an image encoding method and device according to the present disclosure, a weight for the weighted sum may be determined based on a comparison between the determined intra prediction mode and an intra prediction mode derived based on the cost.

In an image encoding method and device according to the present disclosure, a plurality of reference lines may be used to correct a prediction sample of the current block.

In an image encoding method and device according to the present disclosure, any one of the plurality of reference lines is a reference line used to generate a prediction sample of the current block, and information indicating another one of the plurality of reference lines may be signaled through a bitstream.

A computer-readable recording medium that stores a bitstream encoded by an image encoding method according to the present disclosure may be provided.

Technical Effect

According to the present disclosure, a reference line for intra prediction may be efficiently determined.

According to the present disclosure, encoding efficiency of an intra prediction mode of a current block may be improved.

According to the present disclosure, accuracy of intra prediction may be improved.

Effects obtainable from the present disclosure are not limited to the above-mentioned effects and other unmentioned effects may be clearly understood from the following description by those having ordinary skill in the technical field to which the present disclosure pertains.

BEST MODE

Figure 1:
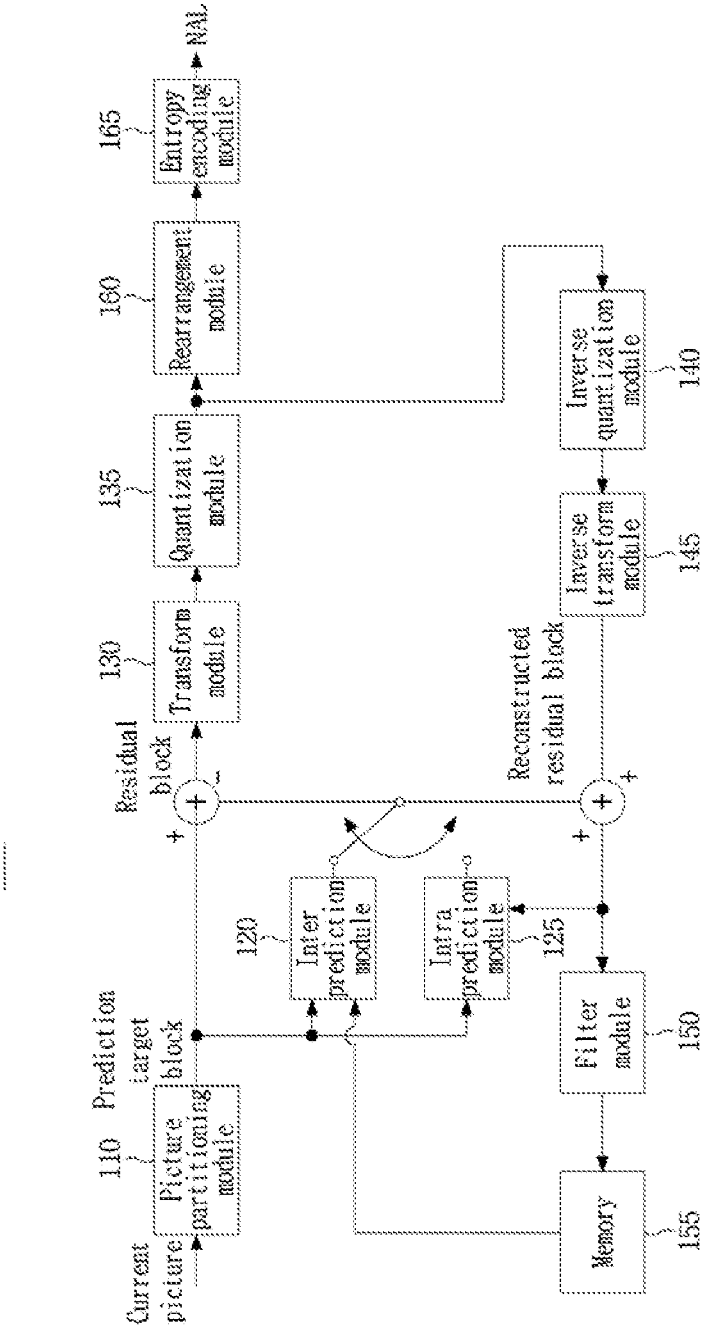
FIG. 1 is a block diagram showing an image encoding device according to an embodiment of the present disclosure.

As the present disclosure may make various changes and have several embodiments, specific embodiments will be illustrated in a drawing and described in detail. But, it is not intended to limit the present disclosure to a specific embodiment, and it should be understood that it includes all changes, equivalents or substitutes included in an idea and a technical scope for the present disclosure. A similar reference numeral was used for a similar component while describing each drawing.

A term such as first, second, etc. may be used to describe various components, but the components should not be limited by the terms. The terms are used only to distinguish one component from other components. For example, without going beyond a scope of a right of the present disclosure, a first component may be referred to as a second component and similarly, a second component may be also referred to as a first component. A term of and/or includes a combination of a plurality of relative entered items or any item of a plurality of relative entered items.

When a component is referred to as being "linked" or "connected" to other component, it should be understood that it may be directly linked or connected to that other component, but other component may exist in the middle. On the other hand, when a component is referred to as being "directly linked" or "directly connected" to other component, it should be understood that other component does not exist in the middle.

As terms used in this application are just used to describe a specific embodiment, they are not intended to limit the present disclosure. Expression of the singular includes expression of the plural unless it clearly has a different meaning contextually. In this application, it should be understood that a term such as "include" or "have", etc. is to designate the existence of characteristics, numbers, steps, motions, components, parts or their combinations entered in the specification, but is not to exclude a possibility of addition or existence of one or more other characteristics, numbers, steps, motions, components, parts or their combinations in advance.

Hereinafter, referring to the attached drawings, a desirable embodiment of the present disclosure will be described in more detail. Hereinafter, the same reference numeral is used for the same component in a drawing and an overlapping description for the same component is omitted.

FIG. 1 is a block diagram showing an image encoding device according to an embodiment of the present disclosure.

Referring to FIG. 1, an image encoding device 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

As each construction unit shown in FIG. 1 is independently shown to represent different characteristic functions in an image encoding device, it does not mean that each construction unit is constituted by separated hardware or one software unit. That is, as each construction unit is included by being enumerated as each construction unit for convenience of a description, at least two construction units of each construction unit may be combined to constitute one construction unit or one construction unit may be partitioned into a plurality of construction units to perform a function, and even an integrated embodiment and a separated embodiment of each construction unit are also included in a scope of a right of the present disclosure unless they are departing from the essence of the present disclosure.

Further, some components may be just an optional component for improving performance, not a necessary component which perform an essential function in the present disclosure. The present disclosure may be implemented by including only a construction unit necessary for implementing the essence of the present disclosure excluding a component used to just improve performance, and a structure including only a necessary component excluding an optional component used to just improve performance is also included in a scope of a right of the present disclosure.

A picture partitioning unit 110 may partition an input picture into at least one processing unit. In this case, a processing unit may be a prediction unit (PU), a transform unit (TU) or a coding unit (CU). In a picture partitioning unit 110, one picture may be partitioned into a combination of a plurality of coding units, prediction units and transform units and a picture may be encoded by selecting a combination of one coding unit, prediction unit and transform unit according to a predetermined standard (e.g., a cost function).

For example, one picture may be partitioned into a plurality of coding units. In order to partition a coding unit in a picture, a recursive tree structure such as a quad tree may be used, and a coding unit which is partitioned into other coding units by using one image or the largest coding unit as a route may be partitioned with as many child nodes as the number of partitioned coding units. A coding unit which is no longer partitioned according to a certain restriction becomes a leaf node. In other words, when it is assumed that only square partitioning is possible for one coding unit, one coding unit may be partitioned into up to four other coding units.

Hereinafter, in an embodiment of the present disclosure, a coding unit may be used as a unit for encoding or may be used as a unit for decoding.

A prediction unit may be partitioned with at least one square or rectangular shape, etc. in the same size in one coding unit or may be partitioned so that any one prediction unit of prediction units partitioned in one coding unit can have a shape and/or a size different from another prediction unit.

When a prediction unit for which intra prediction is performed based on a coding unit is generated and it is not the minimum coding unit, intra prediction may be performed without being partitioned into a plurality of prediction units N×N.

Prediction units 120 and 125 may include an inter prediction unit 120 performing inter prediction and an intra prediction unit 125 performing intra prediction. Whether to perform inter prediction or intra prediction for a coding unit may be determined and detailed information according to each prediction method (e.g., an intra prediction mode, a motion vector, a reference picture, etc.) may be determined. In this case, a processing unit that prediction is performed may be different from a processing unit that a prediction method and details are determined. For example, a prediction method, a prediction mode, etc. may be determined in a prediction unit and prediction may be performed in a transform unit. A residual value (a residual block) between a generated prediction block and an original block may be input to a transform unit 130. In addition, prediction mode information, motion vector information, etc. used for prediction may be encoded with a residual value in an entropy encoding unit 165 and may be transmitted to a decoding device. When a specific encoding mode is used, an original block may be encoded as it is and transmitted to a decoding unit without generating a prediction block through prediction units 120 or 125.

An inter prediction unit 120 may predict a prediction unit based on information on at least one picture of a previous picture or a subsequent picture of a current picture, or in some cases, may predict a prediction unit based on information on some encoded regions in a current picture. An inter prediction unit 120 may include a reference picture interpolation unit, a motion prediction unit and a motion compensation unit.

A reference picture interpolation unit may receive reference picture information from a memory 155 and generate pixel information equal to or less than an integer pixel in a reference picture. For a luma pixel, a 8-tap DCT-based interpolation filter having a different filter coefficient may be used to generate pixel information equal to or less than an integer pixel in a ¼ pixel unit. For a chroma signal, a 4-tap DCT-based interpolation filter having a different filter coefficient may be used to generate pixel information equal to or less than an integer pixel in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS (New Three-Step Search Algorithm), etc. may be used. A motion vector may have a motion vector value in a ½ or ¼ pixel unit based on an interpolated pixel. A motion prediction unit may predict a current prediction unit by varying a motion prediction method. As a motion prediction method, various methods such as a skip method, a merge method, an advanced motion vector prediction (AMVP) method, an intra block copy method, etc. may be used.

An intra prediction unit 125 may generate a prediction unit based on reference pixel information around a current block which is pixel information in a current picture. When a neighboring block in a current prediction unit is a block which performed inter prediction and accordingly, a reference pixel is a pixel which performed inter prediction, a reference pixel included in a block which performed inter prediction may be used by being replaced with reference pixel information of a surrounding block which performed intra prediction. In other words, when a reference pixel is unavailable, unavailable reference pixel information may be used by being replaced with at least one reference pixel of available reference pixels.

A prediction mode in intra prediction may have a directional prediction mode using reference pixel information according to a prediction direction and a non-directional mode not using directional information when performing prediction. A mode for predicting luma information may be different from a mode for predicting chroma information and intra prediction mode information used for predicting luma information or predicted luma signal information may be utilized to predict chroma information.

When a size of a prediction unit is the same as that of a transform unit in performing intra prediction, intra prediction for a prediction unit may be performed based on a pixel at a left position of a prediction unit, a pixel at a top-left position and a pixel at a top position. However, if a size of a prediction unit is different from a size of a transform unit when intra prediction is performed, intra prediction may be performed by using a reference pixel based on a transform unit. In addition, intra prediction using N×N partition may be used only for the minimum coding unit.

An intra prediction method may generate a prediction block after applying an adaptive intra smoothing (AIS) filter to a reference pixel according to a prediction mode. A type of an AIS filter applied to a reference pixel may be different. In order to perform an intra prediction method, an intra prediction mode in a current prediction unit may be predicted from an intra prediction mode in a prediction unit around a current prediction unit. When a prediction mode in a current prediction unit is predicted by using mode information predicted from a surrounding prediction unit, information that a prediction mode in a current prediction unit is the same as a prediction mode in a surrounding prediction unit may be transmitted by using predetermined flag information if an intra prediction mode in a current prediction unit is the same as an intra prediction mode in a surrounding prediction unit, and prediction mode information of a current block may be encoded by performing entropy encoding if a prediction mode in a current prediction unit is different from a prediction mode in a surrounding prediction unit.

In addition, a residual block may be generated which includes information on a residual value that is a difference value between a prediction unit which performed prediction based on a prediction unit generated in prediction units 120 and 125 and an original block in a prediction unit. A generated residual block may be input to a transform unit 130.

A transform unit 130 may transform an original block and a residual block including residual value information in a prediction unit generated through prediction units 120 and 125 by using a transform method such as DCT (Discrete Cosine Transform), DST (Discrete Sine Transform), KLT. Whether to apply DCT, DST or KIT to transform a residual block may be determined based on intra prediction mode information in a prediction unit used to generate a residual block.

A quantization unit 135 may quantize values transformed into a frequency domain in a transform unit 130. A quantization coefficient may be changed according to a block or importance of an image. A value calculated in a quantization unit 135 may be provided to a dequantization unit 140 and a rearrangement unit 160.

A rearrangement unit 160 may perform rearrangement of a coefficient value for a quantized residual value.

A rearrangement unit 160 may change a coefficient in a shape of a two-dimensional block into a shape of a one-dimensional vector through a coefficient scan method. For example, a rearrangement unit 160 may scan a DC coefficient to a coefficient in a high-frequency domain by using a zig-zag scan method and change it into a shape of a one-dimensional vector. According to a size of a transform unit and an intra prediction mode, instead of zig-zag scan, vertical scan where a coefficient in a shape of a two-dimensional block is scanned in a column direction or horizontal scan where a coefficient in a shape of a two-dimensional block is scanned in a row direction may be used. In other words, which scan method among zig-zag scan, vertical directional scan and horizontal directional scan will be used may be determined according to a size of a transform unit and an intra prediction mode.

An entropy encoding unit 165 may perform entropy encoding based on values calculated by a rearrangement unit 160. Entropy encoding, for example, may use various encoding methods such as exponential Golomb, CAVLC (Context-Adaptive Variable Length Coding), CABAC (Context-Adaptive Binary Arithmetic Coding).

An entropy encoding unit 165 may encode a variety of information such as residual value coefficient information and block type information in a coding unit, prediction mode information, partitioning unit information, prediction unit information and transmission unit information, motion vector information, reference frame information, block interpolation information, filtering information, etc. from a rearrangement unit 160 and prediction units 120 and 125.

An entropy encoding unit 165 may perform entropy encoding for a coefficient value in a coding unit which is input from a rearrangement unit 160.

A dequantization unit 140 and an inverse transform unit 145 dequantize values quantized in a quantization unit 135 and inversely transform values transformed in a transform unit 130. A residual value generated by a dequantization unit 140 and an inverse transform unit 145 may be combined with a prediction unit predicted by a motion prediction unit, a motion compensation unit and an intra prediction unit included in prediction units 120 and 125 to generate a reconstructed block.

A filter unit 150 may include at least one of a deblocking filter, an offset correction unit and an adaptive loop filter (ALF).

A deblocking filter may remove block distortion which is generated by a boundary between blocks in a reconstructed picture. In order to determine whether deblocking is performed, whether a deblocking filter will be applied to a current block may be determined based on a pixel included in several rows or columns included in a block. When a deblocking filter is applied to a block, a strong filter or a weak filter may be applied according to required deblocking filtering strength. In addition, in applying a deblocking filter, when horizontal filtering and vertical filtering are performed, horizontal directional filtering and vertical directional filtering may be set to be processed in parallel.

An offset correction unit may correct an offset with an original image in a unit of a pixel for an image that deblocking was performed. In order to perform offset correction for a specific picture, a region where an offset will be performed may be determined after dividing a pixel included in an image into the certain number of regions and a method in which an offset is applied to a corresponding region or a method in which an offset is applied by considering edge information of each pixel may be used.

Adaptive loop filtering (ALF) may be performed based on a value obtained by comparing a filtered reconstructed image with an original image. After a pixel included in an image is divided into predetermined groups, filtering may be discriminately performed per group by determining one filter which will be applied to a corresponding group. Information related to whether to apply ALF may be transmitted per coding unit (CU) for a luma signal and a shape and a filter coefficient of an ALF filter to be applied may vary according to each block. In addition, an ALF filter in the same shape (fixed shape) may be applied regardless of characteristic of a block to be applied.

A memory 155 may store a reconstructed block or picture calculated through a filter unit 150 and a stored reconstructed block or picture may be provided to prediction units 120 and 125 when performing inter prediction.

Figure 2:
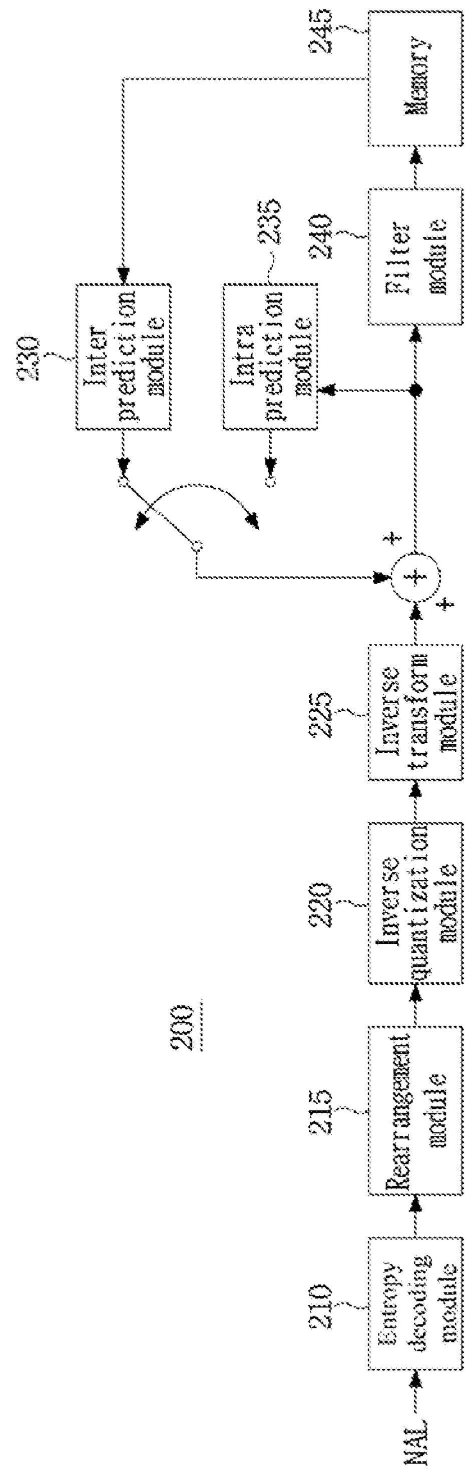
FIG. 2 is a block diagram showing an image decoding device according to an embodiment of the present disclosure.

FIG. 2 is a block diagram showing an image decoding device according to an embodiment of the present disclosure.

Referring to FIG. 2, an image decoding device 200 may include an entropy decoding unit 210, a rearrangement unit 215, a dequantization unit 220, an inverse transform unit 225, prediction units 230 and 235, a filter unit 240, and a memory 245.

When an image bitstream is input from an image encoding device, an input bitstream may be decoded according to a procedure opposite to that of an image encoding device.

An entropy decoding unit 210 may perform entropy decoding according to a procedure opposite to a procedure in which entropy encoding is performed in an entropy encoding unit of an image encoding device. For example, in response to a method performed in an image encoding device, various methods such as Exponential Golomb, CAVLC (Context-Adaptive Variable Length Coding), CABAC (Context-Adaptive Binary Arithmetic Coding) may be applied.

An entropy decoding unit 210 may decode information related to intra prediction and inter prediction performed in an encoding device.

A rearrangement unit 215 may perform rearrangement based on a method that a bitstream entropy-decoded in an entropy decoding unit 210 is rearranged in an encoding unit. Coefficients expressed in a form of a one-dimensional vector may be rearranged by being reconstructed into coefficients in a form of a two-dimensional block. A rearrangement unit 215 may receive information related to coefficient scanning performed in an encoding unit and perform rearrangement through a method in which scanning is inversely performed based on scanning order performed in a corresponding encoding unit.

A dequantization unit 220 may perform dequantization based on a quantization parameter provided from an encoding device and a coefficient value of a rearranged block.

An inverse transform unit 225 may perform transform performed in a transform unit, i.e., inverse transform for DCT, DST, and KLT, i.e., inverse DCT, inverse DST and inverse KLT for a result of quantization performed in an image encoding device. Inverse transform may be performed based on a transmission unit determined in an image encoding device. In an inverse transform unit 225 of an image decoding device, a transform technique (for example, DCT, DST, KLT) may be selectively performed according to a plurality of information such as a prediction method, a size of a current block, a prediction mode, etc.

Prediction units 230 and 235 may generate a prediction block based on information related to generation of a prediction block provided from an entropy decoding unit 210 and pre-decoded block or picture information provided from a memory 245.

As described above, when a size of a prediction unit is the same as a size of a transform unit in performing intra prediction in the same manner as an operation in an image encoding device, intra prediction for a prediction unit may be performed based on a pixel at a left position of a prediction unit, a pixel at a top-left position and a pixel at a top position, but when a size of a prediction unit is different from a size of a transform unit in performing intra prediction, intra prediction may be performed by using a reference pixel based on a transform unit. In addition, intra prediction using N×N partitioning may be used only for the smallest coding unit.

Prediction units 230 and 235 may include a prediction unit determination unit, an inter prediction unit and an intra prediction unit. A prediction unit determination unit may receive a variety of information such as prediction unit information, prediction mode information of an intra prediction method, motion prediction-related information of an inter prediction method, etc. which are input from an entropy decoding unit 210, divide prediction unit in a current coding unit and determine whether a prediction unit performs inter prediction or intra prediction. An inter prediction unit 230 may perform inter prediction for a current prediction unit based on information included in at least one picture of a previous picture or a subsequent picture of a current picture including a current prediction unit by using information necessary for inter prediction in a current prediction unit provided from an image encoding device. Alternatively, inter prediction may be performed based on information on some regions which are pre-reconstructed in a current picture including a current prediction unit.

In order to perform inter prediction, whether a motion prediction method in a prediction unit included in a corresponding coding unit is a skip mode, a merge mode, an AMVP mode, or an intra block copy mode may be determined based on a coding unit.

An intra prediction unit 235 may generate a prediction block based on pixel information in a current picture. When a prediction unit is a prediction unit which performed intra prediction, intra prediction may be performed based on intra prediction mode information in a prediction unit provided from an image encoding device. An intra prediction unit 235 may include an adaptive intra smoothing (AIS) filter, a reference pixel interpolation unit and a DC filter. As a part performing filtering on a reference pixel of a current block, an AIS filter may be applied by determining whether a filter is applied according to a prediction mode in a current prediction unit. AIS filtering may be performed for a reference pixel of a current block by using AIS filter information and a prediction mode in a prediction unit provided from an image encoding device. When a prediction mode of a current block is a mode which does not perform AIS filtering, an AIS filter may not be applied.

When a prediction mode in a prediction unit is a prediction unit which performs intra prediction based on a pixel value which interpolated a reference pixel, a reference pixel interpolation unit may interpolate a reference pixel to generate a reference pixel in a unit of a pixel equal to or less than an integer value. When a prediction mode in a current prediction unit is a prediction mode which generates a prediction block without interpolating a reference pixel, a reference pixel may not be interpolated. A DC filter may generate a prediction block through filtering when a prediction mode of a current block is a DC mode.

A reconstructed block or picture may be provided to a filter unit 240. A filter unit 240 may include a deblocking filter, an offset correction unit and an ALF.

Information on whether a deblocking filter was applied to a corresponding block or picture and information on whether a strong filter or a weak filter was applied when a deblocking filter was applied may be provided from an image encoding device. Information related to a deblocking filter provided from an image encoding device may be provided in a deblocking filter of an image decoding device and deblocking filtering for a corresponding block may be performed in an image decoding device.

An offset correction unit may perform offset correction on a reconstructed image based on offset value information, a type of offset correction, etc. applied to an image when performing encoding.

An ALF may be applied to a coding unit based on information on whether ALF is applied, ALF coefficient information, etc. provided from an encoding device. Such ALF information may be provided by being included in a specific parameter set.

A memory 245 may store a reconstructed picture or block for use as a reference picture or a reference block and provide a reconstructed picture to an output unit.

As described above, hereinafter, in an embodiment of the present disclosure, a coding unit is used as a term of a coding unit for convenience of a description, but it may be a unit which performs decoding as well as encoding.

In addition, as a current block represents a block to be encoded/decoded, it may represent a coding tree block (or a coding tree unit), a coding block (or a coding unit), a transform block (or a transform unit) or a prediction block (or a prediction unit), etc. according to an encoding/decoding step. In this specification, 'unit' may represent a base unit for performing a specific encoding/decoding process and 'block' may represent a pixel array in a predetermined size. Unless otherwise classified, 'block' and 'unit' may be used interchangeably. For example, in the after-described embodiment, it may be understood that a coding block (a coding block) and a coding unit (a coding unit) are used interchangeably.

Figure 3:
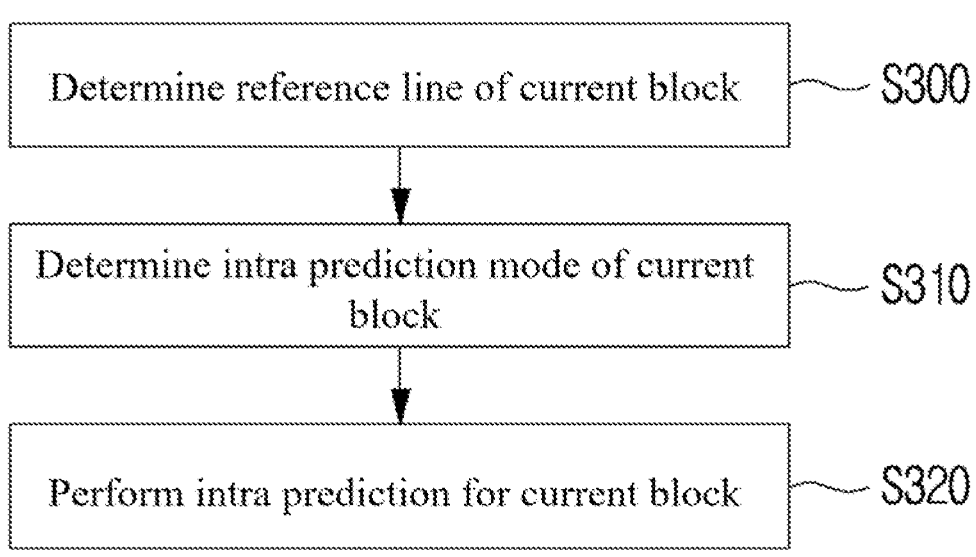
FIG. 3 shows an image encoding/decoding method performed by an image encoding/decoding device according to the present disclosure.

FIG. 3 shows an image encoding/decoding method performed by an image encoding/decoding device according to the present disclosure.

Referring to FIG. 3, a reference line for intra prediction of a current block may be determined S300.

A current block may use one or more of a plurality of reference line candidates pre-defined in an image encoding/decoding device as a reference line for intra prediction. Here, a plurality of pre-defined reference line candidates may include a neighboring reference line adjacent to a current block to be decoded and N non-neighboring reference lines 1-sample to N-samples away from a boundary of a current block. N may be an integer of 1, 2, 3 or more. Hereinafter, for convenience of a description, it is assumed that a plurality of reference line candidates available for a current block consist of a neighboring reference line candidate and three non-neighboring reference line candidates, but it is not limited thereto. In other words, of course, a plurality of reference line candidates available for a current block may include four or more non-neighboring reference line candidates.

An image encoding device may determine an optimal reference line candidate among a plurality of reference line candidates and encode an index for specifying it. An image decoding device may determine a reference line of a current block based on an index signaled through a bitstream. The index may specify any one of a plurality of reference line candidates. A reference line candidate specified by the index may be used as a reference line of a current block.

The number of indexes signaled to determine a reference line of a current block may be 1, 2 or more. As an example, when the number of indexes signaled above is 1, a current block may perform intra prediction by using only a single reference line candidate specified by the signaled index among a plurality of reference line candidates. Alternatively, when the number of indexes signaled above is at least two, a current block may perform intra prediction by using a plurality of reference line candidates specified by a plurality of indexes among a plurality of reference line candidates.

Alternatively, a reference line of a current block may be determined on a side of an image decoding device, and in this case, signaling of the index may be omitted (hereinafter, referred to as a decoder-side reference line determination mode). According to a decoder-side reference line determination mode according to the present disclosure, a reference line of a current block may be determined in a unit of a sample of a current block or in a unit of a sub-region of a current block. With this regard, it is described in detail by referring to FIGS. 4 and 5. Meanwhile, a reference line determination method according to a decoder-side reference line determination mode described later may be equally performed in an image encoding device, and in this case, it may be referred to as an encoder-side reference line determination mode.

Figure 4:
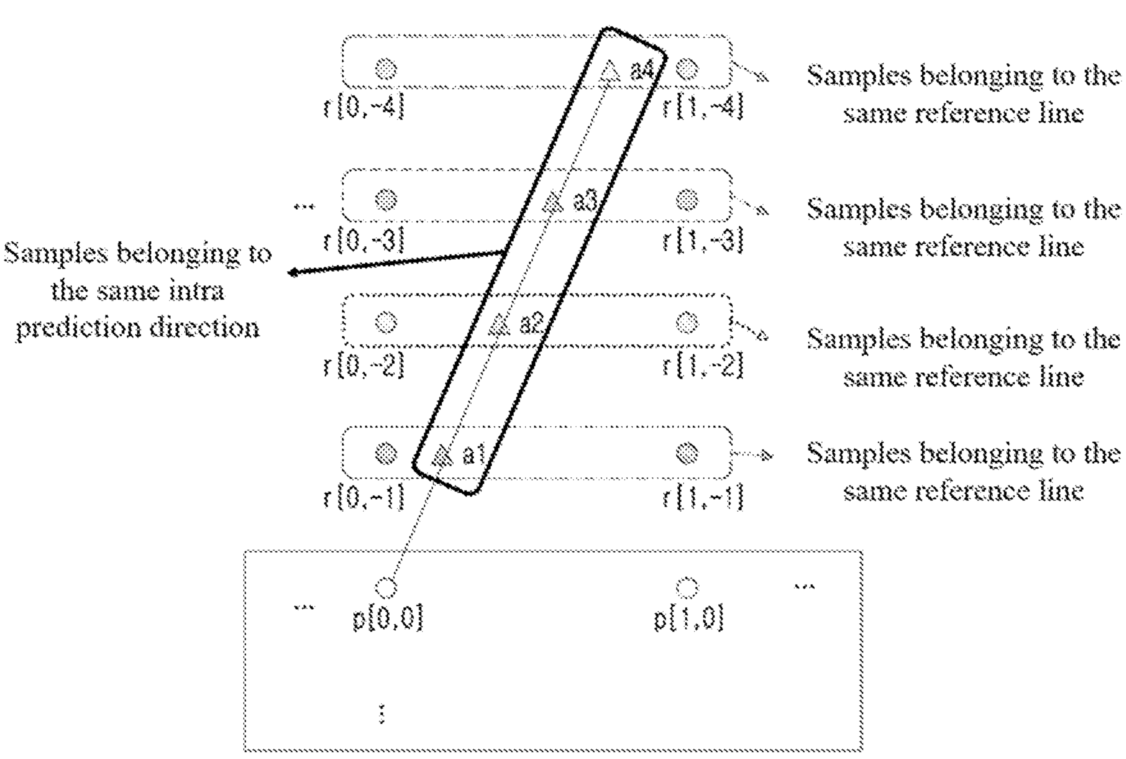
FIG. 4 shows an example in which a reference line is determined in a unit of a sample of a current block according to a decoder-side reference line determination mode according to the present disclosure.

FIG. 4 shows an example in which a reference line is determined in a unit of a sample of a current block according to a decoder-side reference line determination mode according to the present disclosure.

Referring to FIG. 4, four reference line candidates that may be used by a current block are shown. Four reference line candidates may be composed of a first reference line candidate adjacent to a current block and a second to fourth reference line candidate that are 1-sample to 3-samples away from a boundary of a current block.

Through a decoder-side reference line determination mode according to the present disclosure, any one of a second and third reference line candidates positioned between a first reference line candidate and a fourth reference line candidate may be determined as a reference line of a current block. However, it is just an example, and any one of a plurality of reference line candidates positioned between a neighboring reference line candidate adjacent to a current block and a non-neighboring reference line candidate furthest from a boundary of a current block may be determined as a reference line of a current block. For this purpose, a scope of a reference line candidate may be determined.

According to directivity of an intra prediction mode, projection may be performed from a position of a current sample of a current block to a fourth reference line candidate. As shown in FIG. 4, through the projection, projection position a1 to a4 may be determined for a first to fourth reference line candidate, respectively.

A first variable (val_line[x][y][idx]) and a second variable (val_dir[x][y][idx]) for a current sample may be derived. The first variable and the second variable may be derived for a second reference line candidate and a third reference line candidate, respectively. Here, x and y may refer to a coordinate of a current sample to be predicted. In addition, idx may indicate an index/a position of a reference line candidate. As an example, when a scope of the above-described reference line candidate is four reference line candidates, i.e., a first to fourth reference line candidate, idx has a value of 0 and 1, which may show a second reference line candidate and a third reference line candidate, respectively.

The first variable may be derived based on one or more samples belonging to the same reference line candidate. As an example, when an angular line according to an intra prediction mode of a current block passes through a sample at an integer-pel position belonging to a reference line candidate, the first variable may be derived as a sample value at the integer-pel position. Alternatively, when an angular line according to an intra prediction mode of a current block passes between two samples at an integer-pel position belonging to a reference line candidate, the first variable may be derived by interpolating a plurality of samples at an integer-pel position. In this case, a plurality of samples at an integer-pel position may refer to the two samples at an integer-pel position or may refer to 3, 4 or more samples including the two samples at an integer-pel position.

Referring to FIG. 4, an angular line according to an intra prediction mode of a current block passes between two samples at an integer-pel position belonging to a second reference line candidate (i.e., r(0, −2) and r(1, −2)). In this case, a sample value at a position of a2 positioned on the angular line may be derived by interpolating two samples at an integer-pel position belonging to a second reference line candidate. A first variable (val_line[0][0][0]) for a second reference line candidate may be configured as a sample value at a position of a2.

Likewise, an angular line according to an intra prediction mode of a current block passes between two samples at an integer-pel position belonging to a third reference line candidate (i.e., r(0, −3) and r(1, −3)). In this case, a sample value at a position of a3 positioned on the angular line is derived by interpolating two samples at an integer-pel position belonging to a third reference line candidate, which may be configured as a first variable (val_line[0][0][1]) for a third reference line candidate.

The second variable may be derived by interpolating two samples belonging to a different reference line candidate. Here, two samples may be positioned on an angular line according to an intra prediction mode of a current block. Alternatively, two samples may be a sample at an integer-pel position adjacent to an angular line according to an intra prediction mode of a current block. According to directivity of an intra prediction mode of a current block, both of the two samples may be a sample at an integer-pel position or at least one of two samples may be a sample at a fractional-pel position. In this case, the sample at a fractional-pel position may be generated by interpolating a plurality of samples at an integer-pel position belonging to the same reference line candidate. The number of a plurality of samples at an integer-pel position used for the interpolation may be 2, 3, 4, or more.

Referring to FIG. 4, a sample value at a position of a2 may be generated by interpolating a sample at a position of a1 in a first reference line candidate and a sample at a position of a4 in a fourth reference line candidate. A second variable (val_dir[0][0][0]) for a second reference line candidate may be configured as the sample value at a position of a2.

Likewise, a sample value at a position of a3 may be generated by interpolating a sample at a position of a1 in a first reference line candidate and a sample at a position of a4 in a fourth reference line candidate. A second variable (val_dir[0][0][1]) for a third reference line candidate may be configured as the sample value at a position of a3.

A reference line of a current block may be determined based on at least one of a first variable or a second variable derived for a second and third reference line candidate. As an example, a reference line of a current block may be determined as in Equation 1 below.

$$\text{ref\_idx}[x][y] = |\text{val\_line}[x][y][0] - \text{val\_dir}[x][y][0]| < |\text{val\_line}[x][y][1] - \text{val\_dir}[x][y][1]|\ ?\ 1 : 2 \quad \text{[Equation 1]}$$

Referring to Equation 1, an absolute value of a difference between a first variable and a second variable for a second reference line candidate may be compared with an absolute value of a difference between a first variable and a second variable for a third reference line candidate. As a result of comparison, when an absolute value for a second reference line candidate is smaller than an absolute value for a third reference line candidate, a reference line of a current block may be determined as a second reference line candidate (i.e., ref_idx=1). On the other hand, when an absolute value for a second reference line candidate is not smaller than an absolute value for a third reference line candidate, a reference line of a current block may be determined as a third reference line candidate (i.e., ref_idx=2).

According to the above-described method, a reference line may be determined in a unit of a sample within a current block. Alternatively, a reference line may be determined through the above-described method only for a sample at a pre-defined position within a current block, and the remaining samples within a current block may share this. As an example, a sample at the pre-defined position may include at least one of a top-left sample, a bottom-left sample, a top-right sample, a bottom-right sample or a center sample in a current block.

Figure 5:
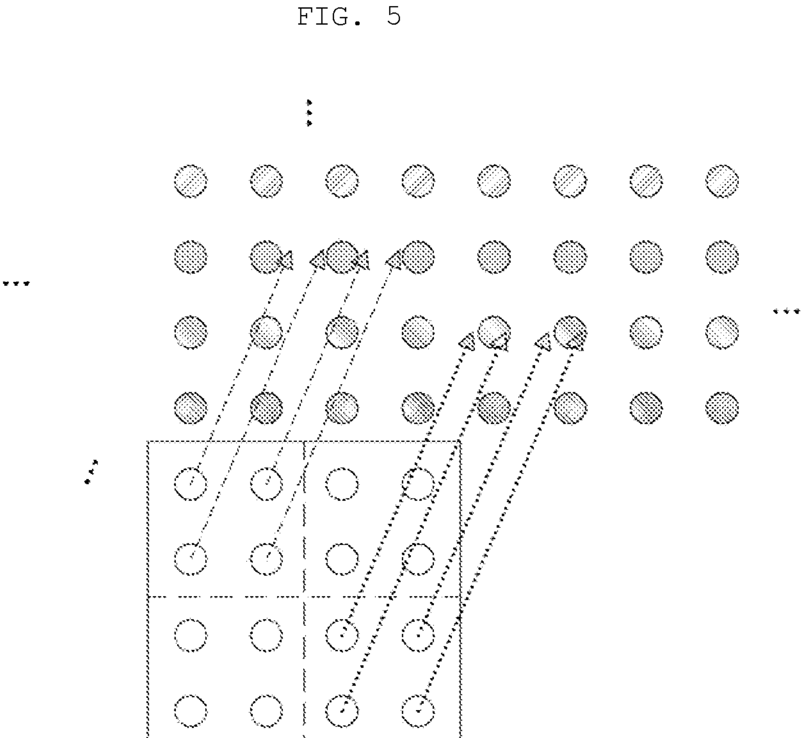
FIG. 5 shows an example in which a reference line is determined in a unit of a sub-region of a current block according to a decoder-side reference line determination mode according to the present disclosure.

FIG. 5 shows an example in which a reference line is determined in a unit of a sub-region of a current block according to a decoder-side reference line determination mode according to the present disclosure.

A current block may be divided into one or more sub-regions. In other words, a current block may consist of one sub-region or at least two sub-regions.

As an example, the sub-region may have a pre-defined size such as n×H, W×n, 2×2, 4×4, or 8×8. Here, H and W represent a height and a width of a current block, respectively, and n may be an integer greater than or equal to 1 and smaller than or equal to a height or a width of a current block. Alternatively, a size/a shape of the sub-region may be adaptively determined based on at least one of a width, a height, a width-to-height ratio, a sum/a product of a width and a height, a maximum/a minimum value of a width and a height, a shape or a component type of a current block, whether it is a directional mode of an intra prediction mode or directivity of an intra prediction mode. However, for convenience of a description, it is assumed that a sub-region has a size of 2×2, as shown in FIG. 5.

SAD[idx] for a current sub-region may be calculated, and in this case, SAD[idx] may be calculated for each of a plurality of reference line candidates. As an example, the SAD[idx] may be calculated as in Equation 2 below.

$$SAD[idx] \mathrel{+}= |\mathrm{val\_line}[x][y][idx] - \mathrm{val\_dir}[x][y][idx]| \quad \text{[Equation 2]}$$

SAD for a reference line candidate corresponding to idx may be calculated by using Equation 2. Specifically, for each sample in a current sub-region, the above-described first variable and second variable may be derived and an absolute value of a difference between a first variable and a second variable may be calculated. Here, a method of deriving a first variable and a second variable is the same as described by referring to FIG. 4. Based on a sum of absolute values calculated for each sample in a current sub-region, SAD for a reference line candidate corresponding to idx may be calculated.

Through the above-described method, SAD[0] for a second reference line candidate and SAD[1] for a third reference line candidate may be calculated and compared. As a result of comparison, when SAD[0] for a second reference line candidate is smaller than SAD[1] for a third reference line candidate, a reference line of a current sub-region may be determined as a second reference line candidate. On the other hand, when SAD[0] for a second reference line candidate is not smaller than SAD[1] for a third reference line candidate, a reference line of a current sub-region may be determined as a third reference line candidate.

According to the above-described method, a reference line may be determined in a unit of a sub-region of a current block. Alternatively, a reference line may be determined through the above-described method only for a sub-region at a pre-defined position within a current block, and the remaining sub-regions within a current block may share it. The sub-region at a pre-defined position may include at least one of a top sub-region, a left sub-region, a top-left sub-region, a bottom-left sub-region, a top-right sub-region, a bottom-right sub-region or a center sub-region in a current block.

In addition to a reference line determined according to the above-described decoder-side reference line determination mode, an additional reference line may be further determined. Here, an additional reference line may be determined among a plurality of pre-defined reference line candidates.

As an example, the additional reference line may be a reference line adjacent to a reference line determined according to the decoder-side reference line determination mode. If a reference line determined according to the decoder-side reference line determination mode is a second reference line candidate, the additional reference line may be determined as at least one of a first reference line candidate or a third reference line candidate.

Alternatively, the additional reference line may be determined as a reference line candidate at a position pre-defined in an image encoding/decoding device. The reference line candidate at a pre-defined position may refer to at least one of a reference line candidate closest to a current block (i.e., a first reference line candidate) or a reference line candidate farthest from a current block (i.e., a fourth reference line candidate).

The decoder-side reference line determination mode may be selectively used based on a flag. The flag may specify whether a reference line of a current block is determined by a decoder-side reference line determination mode.

As an example, when the flag is a first value, a reference line of the current block may be determined by a decoder-side reference line determination mode. On the other hand, when the flag is a second value, a reference line of the current block may be determined based on a signaled index. There may be a limit that the index is signaled only when the flag is a second value. The index may indicate any one of a plurality of reference line candidates pre-defined in an image encoding/decoding device. Alternatively, the index may indicate any one of some reference line candidates, not all of a plurality of pre-defined reference line candidates. Here, some reference line candidates may be (first reference line candidate), (second reference line candidate), (third reference line candidate), (fourth reference line candidate), (first reference line candidate, second reference line candidate), (first reference line candidate, third reference line candidate), (first reference line candidate, fourth reference line candidate), (first reference line candidate, second reference line candidate, third reference line candidate), (first reference line candidate, second reference line candidate, fourth reference line candidate), (first reference line candidate, third reference line candidate, fourth reference line candidate) or (second reference line candidate, third reference line candidate, fourth reference line candidate). In other words, when a flag is a second value, a reference line of a current block may not be determined by a decoder-side reference line determination mode. In this case, the number of reference line candidates available for a current block may be reduced to 1, 2, or 3.

As an example, when the flag is a first value, a reference line of a current block may be determined by a decoder-side reference line determination mode. On the other hand, when the flag is a second value, a reference line of a current block may be determined based on a default reference line predefined in an image encoding/decoding device. Here, a default reference line may refer to a reference line candidate closest to a current block (i.e., a first reference line candidate) or a reference line candidate furthest from a current block (i.e., a fourth reference line candidate).

Referring to FIG. 3, an intra prediction mode of a current block may be determined S310.

An intra prediction mode of a current block may be determined among a plurality of intra prediction modes pre-defined in an image encoding/decoding device. The plurality of pre-defined intra prediction modes are described by referring to FIG. 6.

Figure 6:
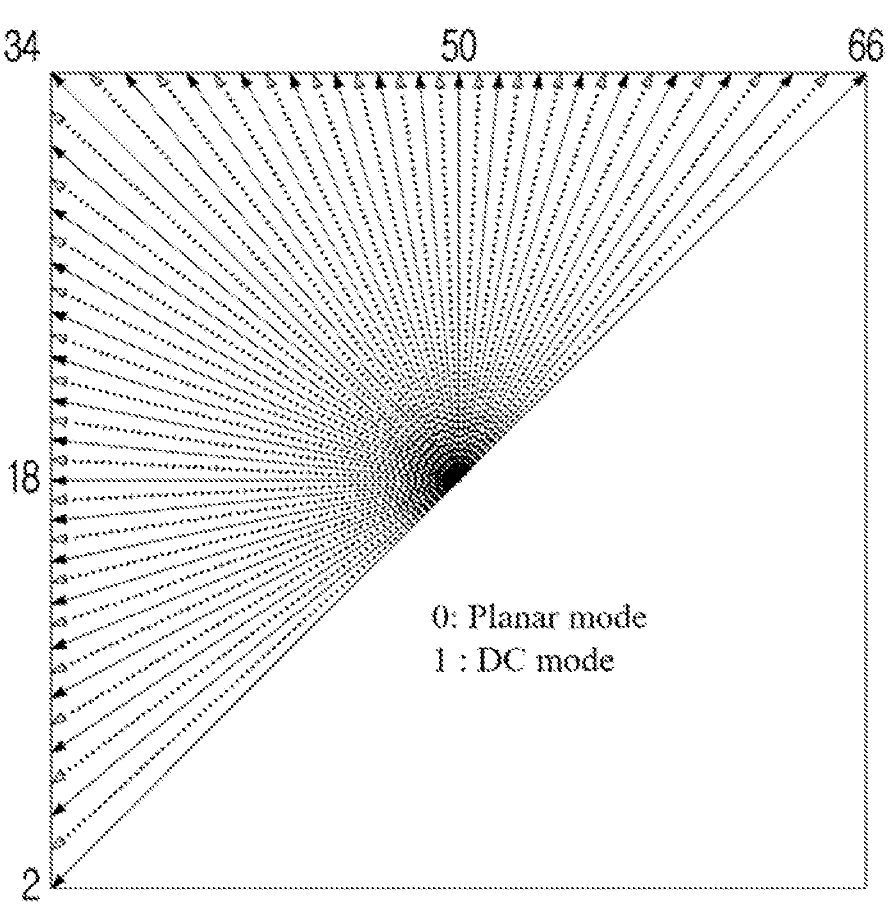
FIG. 6 shows an example of a plurality of intra prediction modes according to the present disclosure.

FIG. 6 shows an example of a plurality of intra prediction modes according to the present disclosure.

Referring to FIG. 6, a plurality of intra prediction modes pre-defined in an image encoding/decoding device may be composed of a non-directional mode and a directional mode. A non-directional mode may include at least one of a planar mode or a DC mode. A directional mode may include directional mode 2 to 66.

Among the plurality of intra prediction modes, K candidate modes (most probable mode, MPM) may be selected. A candidate list including a selected candidate mode may be generated. An index indicating any one of candidate modes belonging to a candidate list may be signaled. An intra prediction mode of a current block may be determined based on a candidate mode indicated by the index. As an example, a candidate mode indicated by the index may be configured as an intra prediction mode of a current block. Alternatively, an intra prediction mode of a current block may be determined based on a value of a candidate mode indicated by the index and a predetermined difference value. The difference value may be defined as a difference between a value of an intra prediction mode of the current block and a value of a candidate mode indicated by the index. The difference value may be signaled through a bitstream. Alternatively, the difference value may be a value pre-defined in an image encoding/decoding device.

Alternatively, an intra prediction mode of a current block may be determined based on a flag showing whether a mode identical to an intra prediction mode of a current block exists in the candidate list. As an example, when the flag is a first value, an intra prediction mode of a current block may be determined from the candidate list. In this case, an index indicating any one of a plurality of candidate modes belonging to a candidate list may be signaled. A candidate mode indicated by the index may be configured as an intra prediction mode of a current block. On the other hand, when the flag is a second value, any one of the remaining intra prediction modes may be configured as an intra prediction mode of a current block. The remaining intra prediction modes may refer to a mode excluding a candidate mode belonging to the candidate list among a plurality of predefined intra prediction modes. When the flag is a second value, an index indicating any one of the remaining intra prediction modes may be signaled. An intra prediction mode indicated by the signaled index may be configured as an intra prediction mode of a current block.

An intra prediction mode of a current block may be used to determine a reference line of a current block, and in this case, S310 may be performed before S300.

Referring to FIG. 3, intra prediction may be performed for a current block based on a reference line and an intra prediction mode of a current block S320.

Hereinafter, an intra prediction method per intra prediction mode is described in detail by referring to FIGS. 7 to 9. However, for convenience of a description, it is assumed that a single reference line is used for intra prediction of a current block, but even when a plurality of reference lines are used, an intra prediction method described later may be applied in the same/similar manner.

Figure 7:
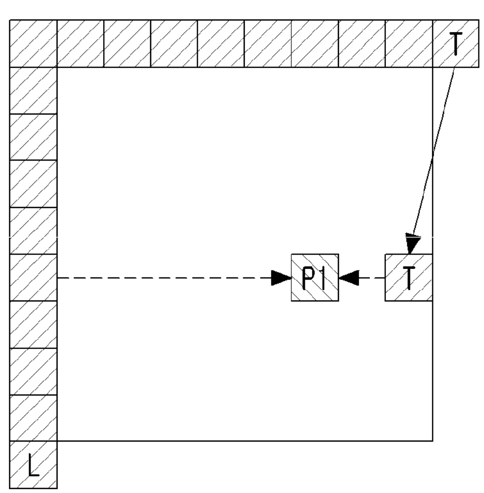
FIG. 7 shows an intra prediction method based on a planar mode according to the present disclosure.
Figure 7:
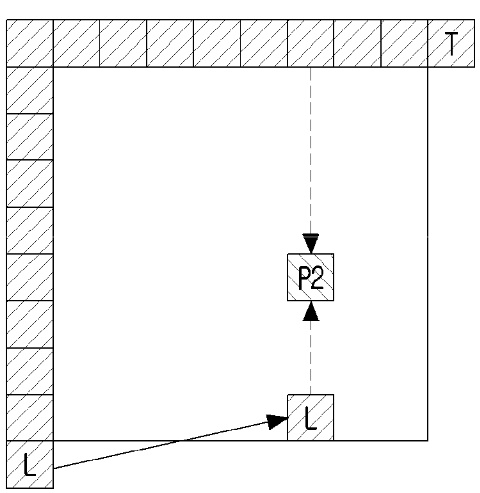

FIG. 7 shows an intra prediction method based on a planar mode according to the present disclosure.

Referring to FIG. 7, T represents a reference sample position at a top-right corner of a current block and L represents a reference sample positioned at a bottom-left corner of a current block. P1 may be generated through interpolation in a horizontal direction. As an example, P1 may be generated by interpolating T with a reference sample positioned on the same horizontal line as P1. P2 may be generated through interpolation in a vertical direction. As an example, P2 may be generated by interpolating L with a reference sample positioned on the same vertical line as P2. A current sample in a current block may be predicted through a weighted sum of P1 and P2 as in Equation 3 below.

$$(\alpha \times P1 + \beta \times P2)/(\alpha + \beta) \quad \text{[Equation 3]}$$

In Equation 3, weight α and β may be determined by considering a width and a height of a current block. According to a width and a height of a current block, weight α and β may have the same value or a different value. If a width and a height of a current block are the same, weight α and β may be configured to be the same and a prediction sample of a current sample may be configured as an average value of P1 and P2. When a width and a height of a current block are not the same, weight α and β may have a different value. As an example, when a width is greater than a height, a smaller value may be configured to a weight corresponding to a width of a current block and a larger value may be configured to a weight corresponding to a height of a current block. Conversely, when a width is greater than a height, a larger value may be configured to a weight corresponding to a width of a current block and a smaller value may be configured to a weight corresponding to a height of a current block. Here, a weight corresponding to a width of a current block may refer to β and a weight corresponding to a height of a current block may refer to α.

Figure 8:
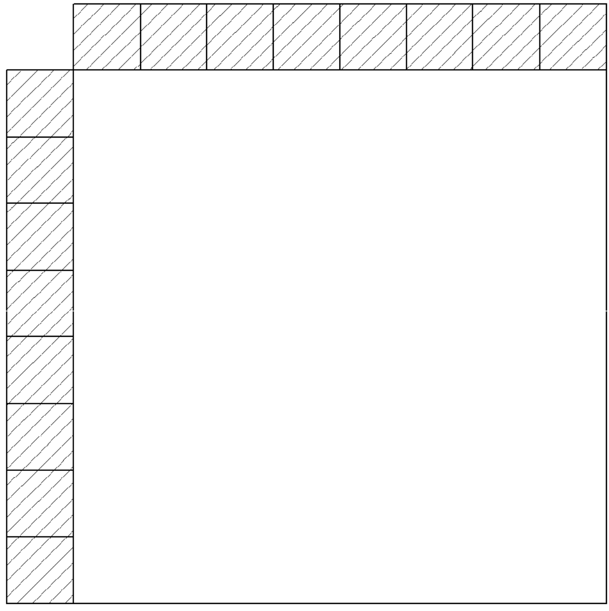
FIG. 8 shows an intra prediction method based on a DC mode according to the present disclosure.

FIG. 8 shows an intra prediction method based on a DC mode according to the present disclosure.

Referring to FIG. 8, an average value of a surrounding sample adjacent to a current block may be calculated, and a calculated average value may be configured as a prediction value of all samples in a current block. Here, a surrounding samples may include a top reference sample and a left reference sample of a current block. However, according to a shape of a current block, an average value may be calculated by using only a top reference sample or a left reference sample. As an example, when a width of a current block is greater than a height, an average value may be calculated by using only a top reference sample of a current block. Alternatively, when a ratio of a width and a height of a current block is greater than or equal to a predetermined threshold value, an average value may be calculated by using only a top reference sample of a current block. Alternatively, when a ratio of a width and a height of a current block is smaller than or equal to a predetermined threshold value, an average value may be calculated by using only a top reference sample of a current block. On the other hand, when a width of a current block is smaller than a height, an average value may be calculated by using only a left reference sample of a current block. Alternatively, when a ratio of a width and a height of a current block is smaller than or equal to a predetermined threshold value, an average value may be calculated by using only a left reference sample of a current block. Alternatively, when a ratio of a width and a height of a current block is greater than or equal to a predetermined threshold value, an average value may be calculated by using only a left reference sample of a current block.

Figure 9:
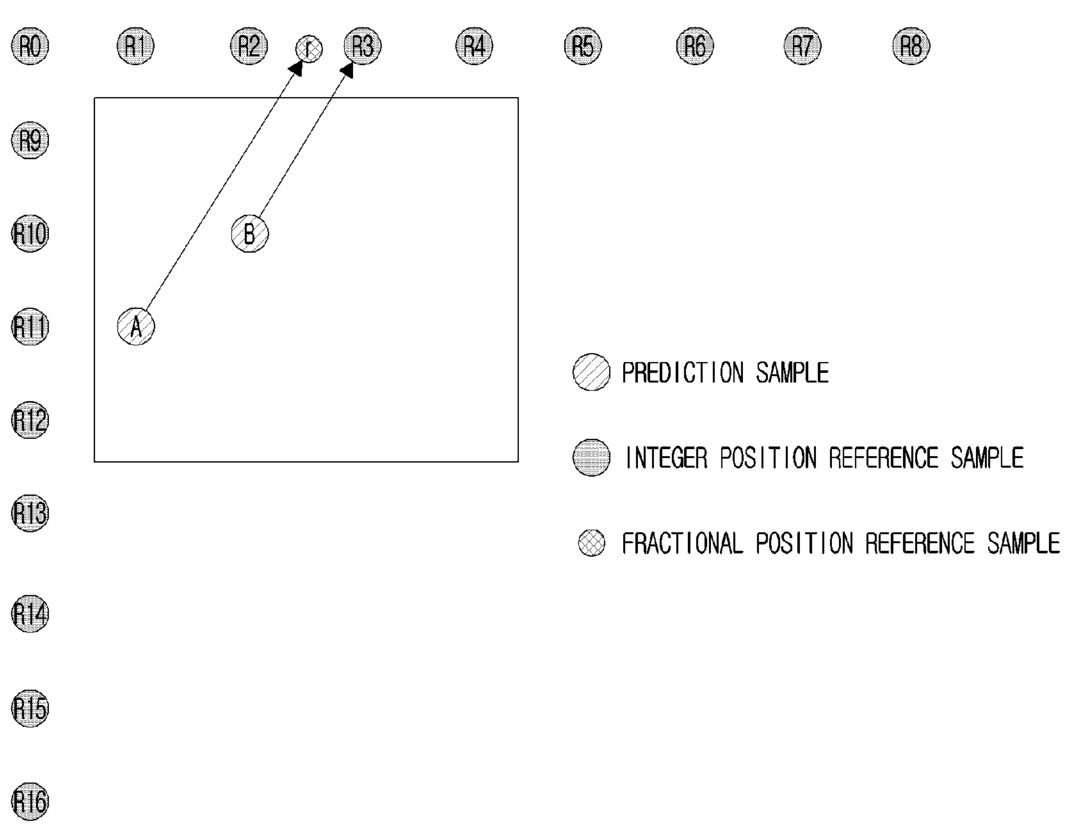
FIG. 9 shows an intra prediction method based on a directional mode according to the present disclosure.

FIG. 9 intra prediction method based on a directional mode according to the present disclosure.

When an intra prediction mode of a current block is a directional mode, projection may be performed to a reference line according to an angle of a corresponding directional mode. When a reference sample exists at a projected position, a corresponding reference sample may be configured as a prediction sample of a current sample. If a reference sample does not exist at a projected position, a sample corresponding to a projected position may be generated by using one or more surrounding samples neighboring a projected position. As an example, interpolation may be performed based on two or more surrounding samples neighboring bidirectionally based on a projected position to generate a sample corresponding to a projected position. Alternatively, one surrounding sample neighboring a projected position may be configured as a sample corresponding to a projected position. In this case, among a plurality of surrounding samples neighboring a projected position, a surrounding sample closest to a projected position may be used. A sample corresponding to a projected position may be configured as a prediction sample of a current sample.

Referring to FIG. 9, for current sample B, when projection is performed to a reference line according to an angle of an intra prediction mode at a corresponding position, a reference sample exists at a projected position (i.e., a reference sample at an integer position, R3). In this case, a reference sample at a projected position may be configured as a prediction sample of current sample B. For current sample A, when projection is performed to a reference line according to an angle of an intra prediction mode at a corresponding position, a reference sample (i.e., a reference sample at an integer position) does not exists at a projected position. In this case, interpolation may be performed based on surrounding samples (e.g., R2 and R3) neighboring a projected position to generate a sample (r) at a fractional position. A generated sample (r) at a fractional position may be configured as a prediction sample of current sample A.

A plurality of reference lines may be used for intra prediction for a current block, which will be described in detail by referring to FIG. 10.

Figure 10:
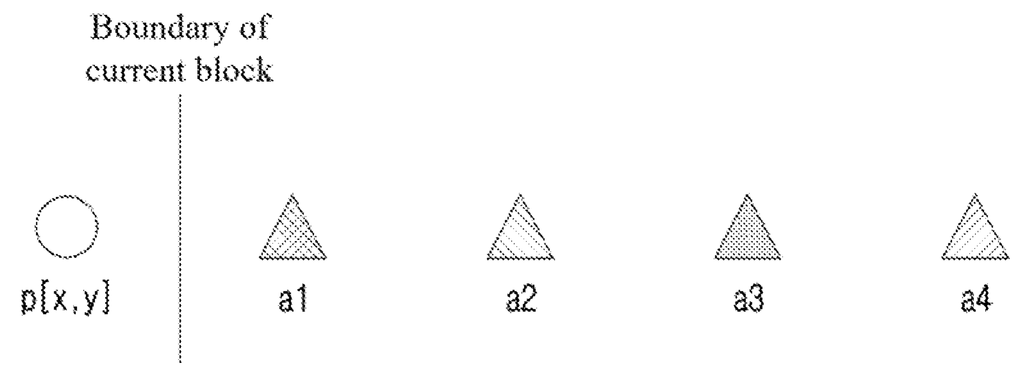
FIG. 10 shows an intra prediction method based on a plurality of reference lines according to the present disclosure.

FIG. 10 shows an intra prediction method based on a plurality of reference lines according to the present disclosure.

Referring to FIG. 10, p[x, y] may represent a position of a prediction sample within a current block, and a1 to a4 may represent a projected position to a plurality of reference lines according to an angle of an intra prediction mode of a current block. In this embodiment, it is assumed that all of the above-described first to fourth reference line candidates are used as a reference line of a current block. However, it is not limited thereto, and two or three reference line candidates of a first to fourth reference line candidate may be used as a reference line of a current block. A method of determining a plurality of reference lines is the same as described by referring to FIG. 3, and an overlapping description is omitted here.

Prediction sample p[x, y] may be generated by performing a weighted sum for a reference sample at a position of a1 to a4. As an example, prediction sample p[x, y] may be generated as in Equation 4 below.

$$p[x, y] = ((w1 \times S_{a1}) + (w2 \times S_{a2}) + (w3 \times S_{a3}) + (w4 \times S_{a4})) / (w1 + w2 + w3 + w4) \quad \text{[Equation 4]}$$

In Equation 4, $S_{a1}$ to $S_{a4}$ represent a sample value at a position of a1 to a4, respectively, and w1 to w4 may refer to a weight applied to a sample at a position of a1 to a4, respectively.

The weight w1 to w4 may be referred to as a weight set. A weight set for intra prediction of a current block may be determined based on index information and a weight table pre-defined in an image encoding/decoding device. The weight table may include a plurality of weight sets. The index information may indicate any one of a plurality of weight sets belonging to a weight table. As an example, the weight table may be defined as in Table 1 below.

TABLE 1

| Index | w1 | w2 | w3 | w4 |
|---|---|---|---|---|
| 0 | 2 | 2 | 2 | 2 |
| 1 | 4 | 2 | 1 | 1 |
| 2 | 1 | 1 | 2 | 4 |
| ... | ... | ... | ... | ... |

An image encoding device may determine an optimal weight set and encode index information to indicate it. An image decoding device may determine the weight set based on index information signaled from an image encoding device. Alternatively, the weight information may be adaptively determined based on an encoding parameter of a current block. Here, an encoding parameter may include at least one of a position, a size, a shape, an intra prediction mode, an angle of an intra prediction mode, a position of a reference line, the number of reference lines, a quantization parameter, whether to apply transform skip or availability of a surrounding block adjacent to a current block.

Alternatively, a fixed weight set pre-defined in an image encoding/decoding device may be used. It may be used when the weight table is not available or when signaling of the weight information is omitted. As an example, as in index 0 in Table 1, the same weight may be used for all. Alternatively, as in index 1 in Table 1, a larger weight may be used as it is closer to a boundary of a current block. Conversely, as in index 2 in Table 1, a larger weight may be used as it is further from a boundary of a current block.

Alternatively, the weight set may be determined based on a reference line determined in S300. As an example, a greater weight may be allocated to a reference line determined in S300, and a smaller weight may be allocated to another reference line.

Whether a plurality of reference lines are used for intra prediction of a current block may be determined in a unit of at least one of a coding block, a sub-coding block, a transform block, a sample line or a sample.

When a plurality of reference lines are used, at least one reference sample may be selected per each reference line, and intra prediction of a current block may be performed based on a selected reference sample. In this case, intra prediction may be performed by using all of selected reference samples or there may be a limit that at least one of selected reference samples is not referred to for intra prediction of a current block.

As an example, among the selected reference samples, when a sample has a difference from a reference sample that is greater than or equal to a predetermined threshold value, it may be excluded from a reference sample for intra prediction of a current block.

Here, a reference sample may be a reference sample at a position of a1 closest to a boundary of a current block. Alternatively, information indicating a reference line candidate to which a reference sample belongs may be signaled separately, and a reference sample belonging to a reference line candidate indicated by corresponding information may be used as a reference sample. Alternatively, a reference sample belonging to a reference line determined in S300 may be used as a reference sample. Alternatively, a reference sample may be configured as an average value of the selected reference sample.

Alternatively, instead of excluding a sample whose difference from a reference sample is greater than or equal to a predetermined threshold value from a reference sample for intra prediction of a current block, a small weight may be allocated to a corresponding sample. As an example, when a difference between a reference sample at a position of a3 and a reference sample at a position of a1 is greater than or equal to the threshold value, a weight allocated to a reference sample at a position of a3 may be smaller than a weight allocated to a reference sample at a position of a1.

Intra prediction may be performed for a surrounding region to which a reference sample belongs to acquire a prediction sample of the surrounding region. A difference between a pre-reconstructed reference sample and a prediction sample of the surrounding region may be calculated. Here, a prediction sample of a surrounding region may be a prediction sample corresponding to a position of the reference sample. When the difference is greater than or equal to a predetermined threshold value, a corresponding reference sample may be excluded from a reference sample for intra prediction of a current block.

The surrounding region may not include a reference sample of a reference line closest to a boundary of a current block. Intra prediction for the surrounding region may be performed by using a sample of a reference line closest to a boundary of the current block. Intra prediction for the surrounding region may be performed based on an intra prediction mode of a current block. Alternatively, intra prediction for the surrounding region may be performed based on a mode pre-defined in an image encoding/decoding device (e.g., a planar mode, a DC mode).

The above-described threshold value may be adaptively determined based on an encoding parameter of a current block. Here, an encoding parameter is the same as described above, and an overlapping description is omitted. Alternatively, the threshold value may be determined based on at least one of the minimum value or the maximum value of the selected reference sample. Information for determining the threshold value may be also signaled through a bitstream.

A prediction sample generated through intra prediction of a current block may be corrected, and a method for correcting a prediction sample is described by referring to FIGS. 11 to 15.

Figure 11:
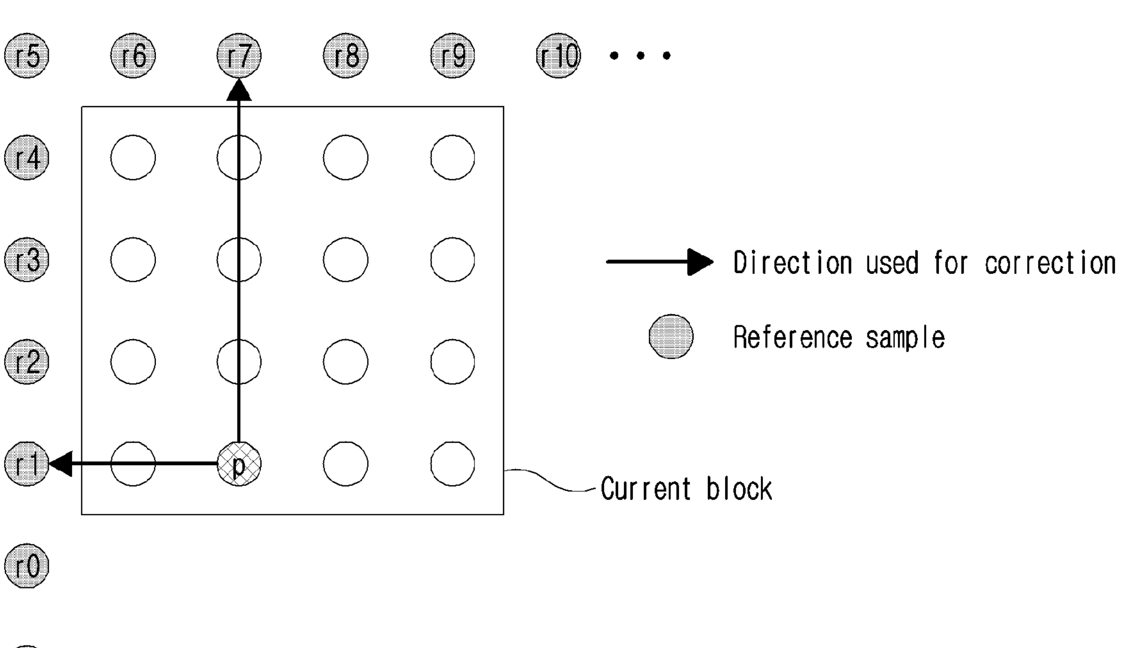
FIGS. 11 and 12 shows a method for correcting a prediction sample according to a non-directional mode as an embodiment according to the present disclosure.
Figure 12:
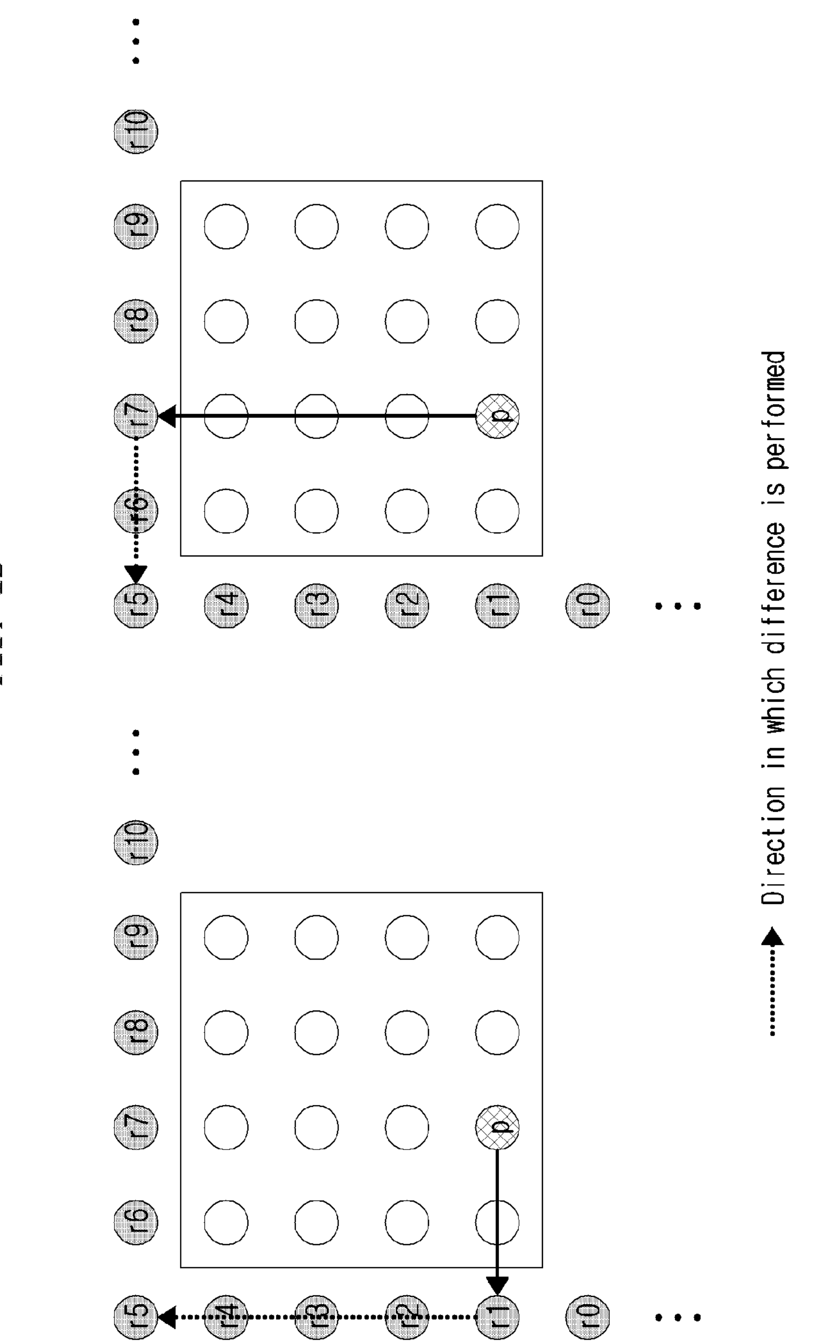

FIGS. 11 and 12 shows a method for correcting a prediction sample according to a non-directional mode as an embodiment according to the present disclosure.

Referring to FIG. 11, a prediction sample of a P position within a current block may be generated. Here, a prediction sample may be generated based on at least one of a planar mode or a DC mode. The prediction sample may be corrected by using at least one of a first reference sample positioned on the same horizontal line as the prediction sample or a second reference sample positioned on the same vertical line as the prediction sample. Here, a first reference sample may include at least one of a sample belonging to a reference line of a current block or a pre-reconstructed sample (or a pre-predicted sample) within a current block. Likewise, a second reference sample may include at least one of a sample belonging to a reference line of a current block or a pre-reconstructed sample (or a pre-predicted sample) within a current block.

As an example, a reference sample at a r1 position may be used as a first reference sample positioned on the same horizontal line as a prediction sample, and a reference sample at a r7 position may be used as a second reference sample positioned on the same vertical line as a prediction sample. Based on a weighted sum of the prediction sample, a first reference sample and a second reference sample, a corrected prediction sample may be generated.

Alternatively, the prediction sample may be corrected based on a difference between at least two reference samples belonging to a reference line of a current block. The difference may be calculated for each of a horizontal direction and a vertical direction of a prediction sample. Alternatively, the difference may be calculated for any one of a horizontal direction or a vertical direction of a prediction sample. As an example, the difference may include at least one of a first difference between a left reference sample and a reference sample at a reference position or a second difference between a top reference sample and a reference sample at a reference position. The left reference sample belongs to a reference line of a current block, and may belong to the same horizontal line as a prediction sample to be corrected. The top reference sample belongs to a reference line of a current block, and may belong to the same vertical line as a prediction sample to be corrected. The reference sample at a pre-defined position belongs to a reference line of a current block, and may belong to a top-left surrounding region of a current block.

A corrected prediction sample may be generated based on a weighted sum of at least two of the prediction sample, the first difference or the second difference. In this case, a weight for the weighted sum may be determined based on at least one of a first distance between a prediction sample and a left reference sample or a second distance between a prediction sample and a top reference sample.

Referring to FIG. 12, a first difference (i.e., a difference in a vertical direction) for a prediction sample at a P position may be determined as a difference between a reference sample (r1) having the same y-coordinate as a prediction sample and a top-left reference sample (r5) of a current block. In addition, a second difference (i.e., a difference in a horizontal direction) for a prediction sample at a P position may be determined as a difference between a reference sample (r7) having the same x-coordinate as a prediction sample and a top-left reference sample (r5) of a current block.

In FIG. 12, it is assumed that a top-left reference sample (r5) of a current block is used as a reference sample at a reference position, and a reference position for calculating a difference in a vertical direction may be the same as a reference position for calculating a difference in a horizontal direction. However, it is not limited thereto, and a reference position for calculating a difference in a vertical direction may be different from a reference position for calculating a difference in a horizontal direction. As an example, a reference position for calculating a difference in a vertical direction may be set as a position of the uppermost sample (r4) among the left reference samples belonging to a reference line of a current block. A reference position for calculating a difference in a horizontal direction may be set as a position of the leftmost sample (r6) among the top reference samples belonging to a reference line of a current block.

Figure 13:
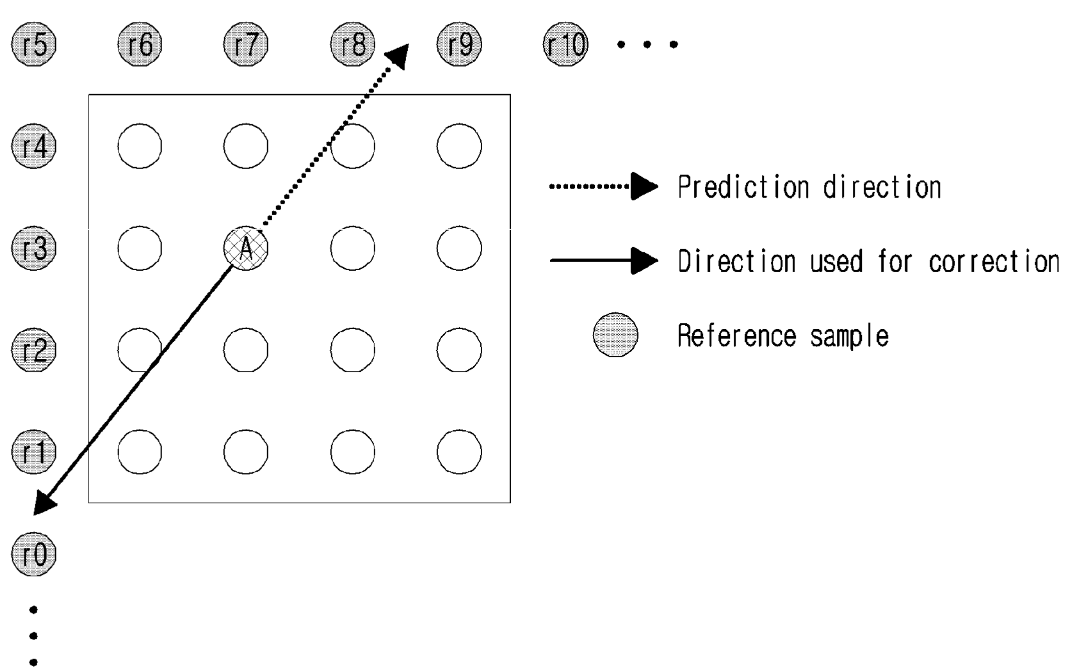
FIGS. 13 and 14 shows a method for correcting a prediction sample according to a directional mode as an embodiment according to the present disclosure.
Figure 14:
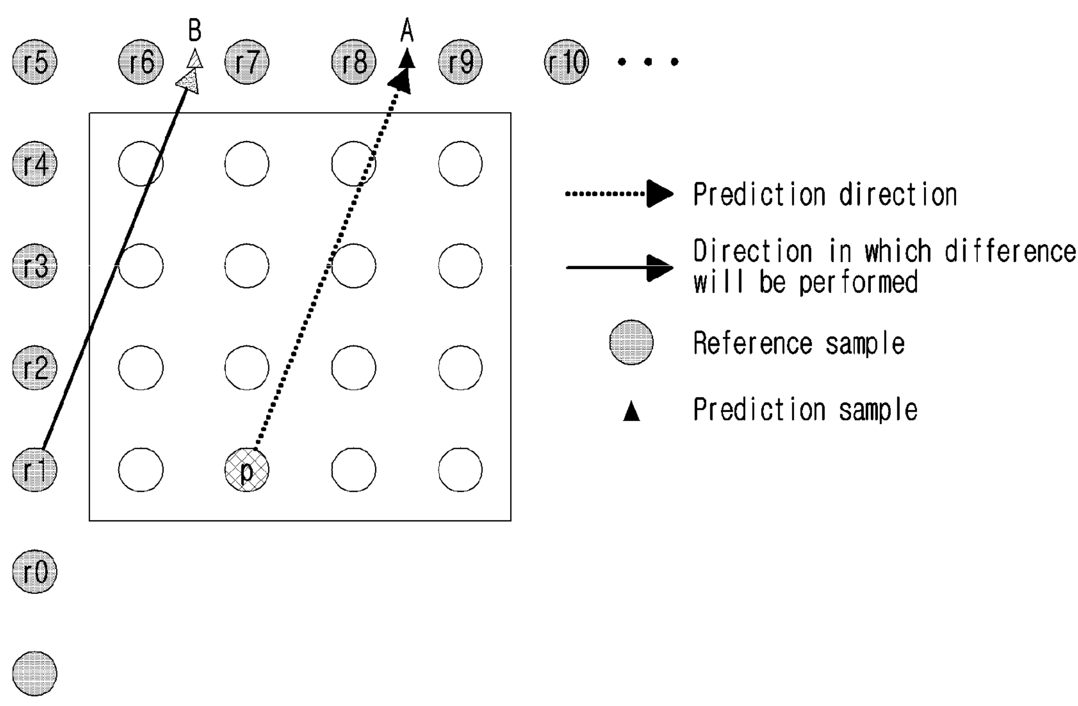

FIGS. 13 and 14 shows a method for correcting a prediction sample according to a directional mode as an embodiment according to the present disclosure.

Referring to FIG. 13, when an intra prediction mode of a current block is a directional mode, projection may be performed on a reference line of a current block in a reverse direction of a prediction direction according to a directional mode. A reference sample at a projected position may be used as a reference sample for correction of a prediction sample (A).

However, if there is no reference sample at a projected position (i.e., when a projected position corresponds to a fractional-pel position), at least one surrounding sample neighboring a projected position may be used as a reference sample for correction of a prediction sample. As an example, a reference sample at a projected position may be generated by interpolating two surrounding samples (r0, r1) adjacent to a projected position, which may be used as a reference sample for correction of a prediction sample (A). Here, two surrounding samples may be a sample at an integer-pel position.

A corrected prediction sample may be generated based on a weighted sum of the prediction sample (A) and a reference sample at a projected position. In this case, a weight for a weighted sum may be determined based on a position of a prediction sample within a current block. As an example, the closer a prediction sample is to a position projected in a reverse direction, the greater weight may be applied to a reference sample at a projected position.

Alternatively, a prediction sample of a current block may be corrected based on a difference between at least two reference samples belonging to a reference line of a current block. Here, reference samples may refer to a sample at an integer-pel position. Alternatively, at least one of reference samples may be a sample at a fractional-pel position. The sample at a fractional-pel position may be generated by interpolating a plurality of surrounding samples neighboring a corresponding fractional-pel position.

Specifically, projection may be performed from a reference sample having the same x-coordinate or y-coordinate as a prediction sample (hereinafter, referred to as a first reference sample) to a reference line of a current block. The projection may be performed in a prediction direction according to an intra prediction mode of a current block or in a reverse direction thereof. Hereinafter, a reference sample at a projected position is referred to as a second reference sample. A prediction sample of a current block may be corrected based on a difference between the first reference sample and the second reference sample.

A position of the first reference sample may be determined based on an intra prediction mode of a current block. As an example, when a prediction direction according to an intra prediction mode of a current block indicates a top reference line, a first reference sample may be set as a reference sample with the same y-coordinate as a prediction sample in a left reference line. On the other hand, when a prediction direction according to an intra prediction mode of a current block indicates a left reference line, a first reference sample may be set as a reference sample with the same x-coordinate as a prediction sample in a top reference line.

Referring to FIG. 14, for a prediction sample at a P position, a prediction direction according to an intra prediction mode of a current block indicates a top reference line, and in this case, a first reference sample belongs to a left reference line, and may be determined as a reference sample (r1) with the same y-coordinate as a prediction sample. Projection may be performed from a first reference sample (r1) to a reference line, and a second reference sample (B) at a projected position may be specified/generated. Based on a difference between a first reference sample (r1) and a second reference sample (B), a prediction sample (P) may be corrected.

A correction method based on a difference between reference samples described above may be applied only to some of a plurality of intra prediction modes pre-defined in an image encoding/decoding device. As an example, only when an intra prediction mode of a current block is any one of mode 2 to mode 18 or any one of mode 50 to mode 66 shown in FIG. 6, a correction method based on a difference between reference samples may be applied. Alternatively, a correction method based on a difference between reference samples may be used adaptively based on at least one of a size/a shape of a current block or a position of a reference line.

As described above, a corrected prediction sample may be generated based on a weighted sum with a reference sample for correction or a difference between at least two reference samples. In this case, a weight for a weighted sum may be determined based on a cost calculated from a predetermined template region, which is described in detail by referring to FIG. 15.

Figure 15:
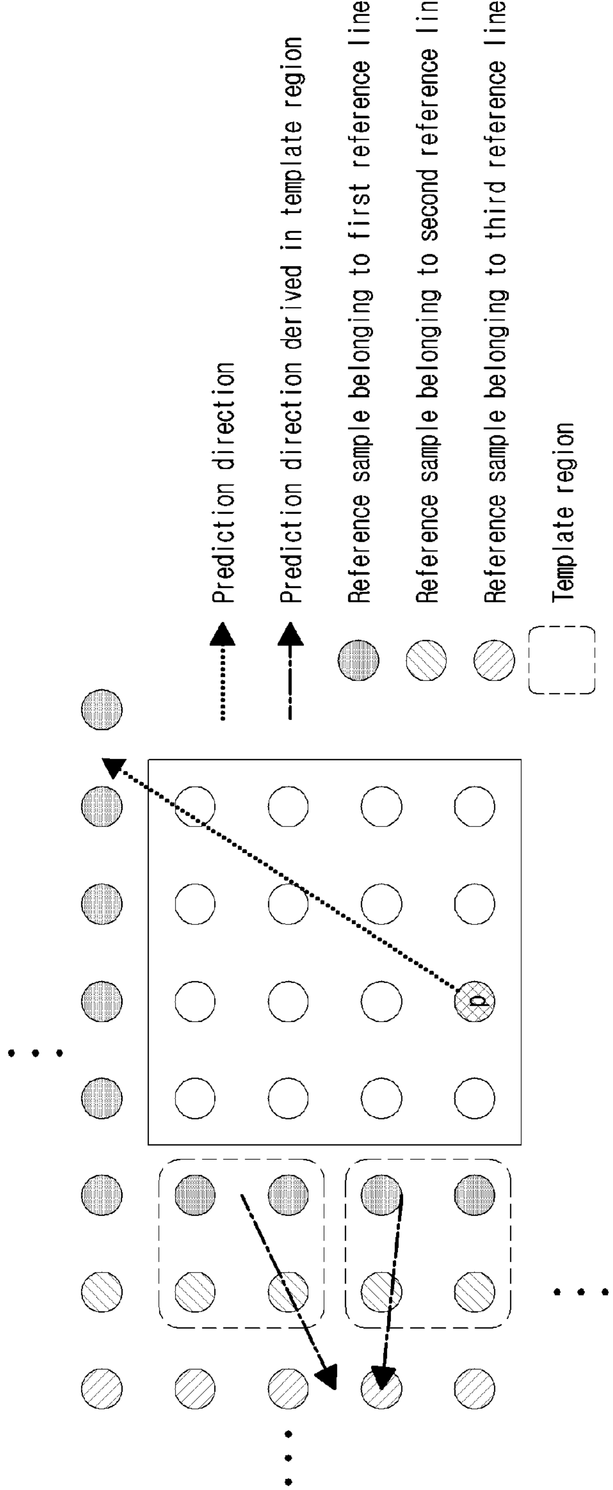
FIG. 15 shows a method for deriving an intra prediction mode based on a template region as an embodiment according to the present disclosure.

FIG. 15 shows a method for deriving an intra prediction mode based on a template region as an embodiment according to the present disclosure.

As a template region of a current block is a region which is reconstructed before a current block, it may include at least one of a top surrounding region, a left surrounding region, a top-left surrounding region, a top-right surrounding region or a bottom-left surrounding region adjacent to a current block. The template region may be a region which is pre-defined in an image encoding/decoding device to derive an intra prediction mode of a current block. However, if at least one of the above-described surrounding regions is not available, an unavailable surrounding region may be excluded from a template region. Alternatively, the template region may be determined by considering a prediction direction of an intra prediction mode of a current block.

Prediction samples of a template region may be generated by performing intra prediction for a template region based on a reference line of a template region. A cost may be calculated based on a difference between the prediction samples and the reconstructed samples of a template region. The cost may be calculated for each of predetermined intra prediction modes. Here, predetermined intra prediction modes may refer to a plurality of intra prediction modes pre-defined in the above-described image encoding/decoding device. Alternatively, predetermined intra prediction modes may refer to a plurality of candidate modes belonging to the above-described candidate list. The cost may be calculated based on a sum of absolute difference (SAD) or a sum of absolute transformed difference (SATD) between prediction samples and reconstructed samples of a template region.

Referring to FIG. 15, when a prediction direction according to an intra prediction mode of a current block indicates a top reference line (or a top reference sample), a template region may be set in a left surrounding region. The template region may be composed of N sample lines (e.g., rows/columns), or may be a block in a preset size adjacent to a current block.

A sample line adjacent to a template region may be set as a reference line for intra prediction of a template region. In FIG. 15, a third sample line is set as a reference line of a template region. A corresponding reference line may be used to derive an intra prediction mode with an optimal cost for a template region.

An intra prediction mode corresponding to the smallest cost among the calculated costs may be set as an intra prediction mode of a template region or a current block. Hereinafter, for convenience of a description, an intra prediction mode determined in S310 and an intra prediction mode derived based on a template region are referred to as a first intra prediction mode and a second intra prediction mode, respectively.

Based on a comparison between the first intra prediction mode and the second intra prediction mode, a weight for a weighted sum may be determined. Here, a comparison may determine at least one of whether a first intra prediction mode is the same as a second intra prediction mode, whether a mode value difference between a first intra prediction mode and a second intra prediction mode is greater than a predetermined threshold value or whether a difference between an angle of a first intra prediction mode and an angle of a second intra prediction mode is greater than a predetermined threshold value.

As an example, when a first intra prediction mode is the same as a second intra prediction mode, a weight applied to a prediction sample may be greater than a weight applied to a reference sample for correction (or a difference between reference samples). Otherwise, a weight applied to a prediction sample may be equal to or smaller than a weight applied to a reference sample for correction (or a difference between reference samples).

If a mode value difference between a first intra prediction mode and a second intra prediction mode is greater than a predetermined threshold value, a weight applied to a prediction sample may be greater than a weight applied to a reference sample for correction (or a difference between reference samples). Otherwise, a weight applied to a prediction sample may be equal to or smaller than a weight applied to a reference sample for correction (or a difference between reference samples). Conversely, when a mode value difference between a first intra prediction mode and a second intra prediction mode is greater than a predetermined threshold value, a weight applied to a prediction sample may be smaller than a weight applied to a reference sample for correction (or a difference between reference samples). Otherwise, a weight applied to a prediction sample may be equal to or greater than a weight applied to a reference sample for correction (or a difference between reference samples).

As a difference between an angle of a first intra prediction mode and an angle of a second intra prediction mode is closer to 0 degrees or 180 degrees, a weight applied to a reference sample for correction (or a difference between reference samples) may be greater than a weight applied to a prediction sample. On the other hand, as a difference between an angle of a first intra prediction mode and an angle of a second intra prediction mode is closer to 90 degrees, a weight applied to a reference sample for correction (or a difference between reference samples) may be smaller than a weight applied to a prediction sample.

Figure 16:
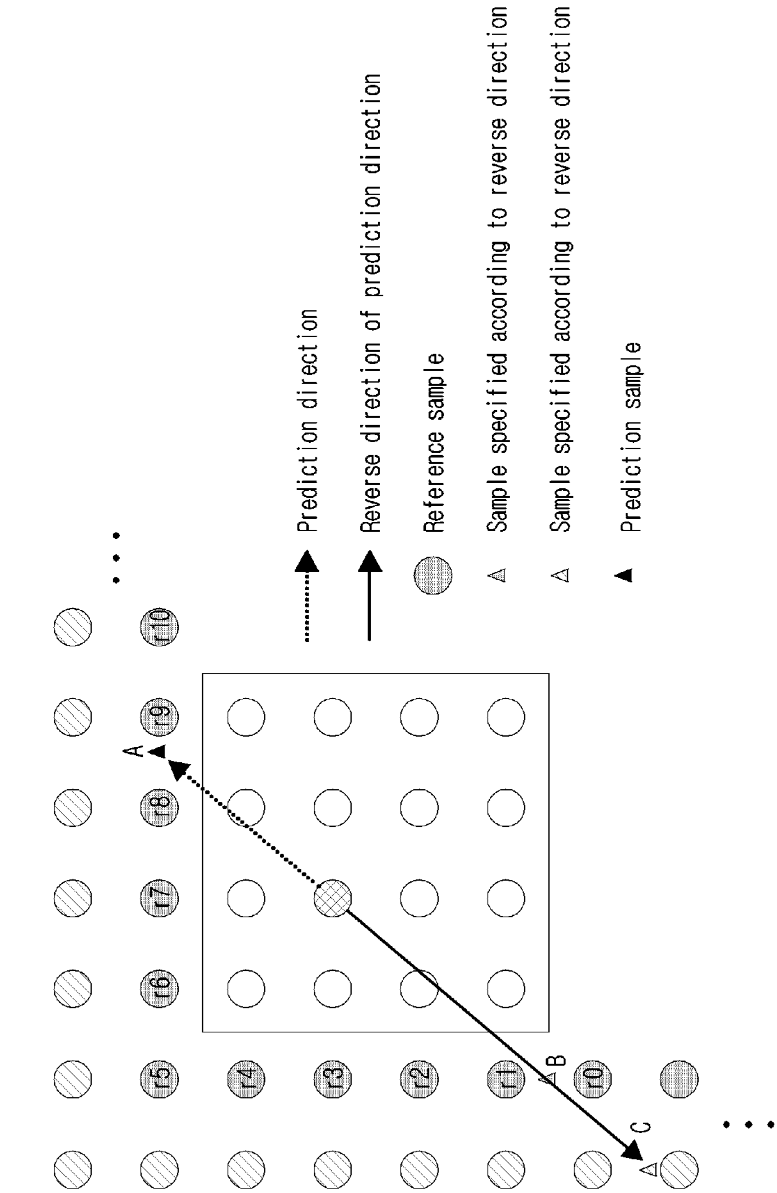
FIG. 16 shows a method for correcting a prediction sample based on a plurality of reference lines as an embodiment according to the present disclosure.

Correction of the prediction sample may be performed based on a plurality of reference lines, which is discussed in detail by referring to FIG. 16.

FIG. 16 shows a method for correcting a prediction sample based on a plurality of reference lines as an embodiment according to the present disclosure.

Referring to FIG. 16, projection may be performed from a position of a prediction sample to a plurality of reference lines. The projection may be performed in a reverse direction of a prediction direction according to an intra prediction mode of a current block. In this case, a projected position may be specified per each reference line, and a reference sample for correction of the prediction sample may be determined based on at least one of reference samples (A, B) at a corresponding position.

FIG. 16 shows a case in which a first reference line and a second reference line are used as a plurality of reference lines, but it is just an example. A plurality of reference lines on which projection is performed may be adaptively selected from reference lines pre-defined in an image encoding/decoding device.

As an example, information representing whether a reference line used to generate the prediction sample is the same as a reference line to which the reference sample for correction belongs may be signaled. If information representing that a reference line used to generate the prediction sample is not the same as a reference line to which the reference sample for correction belongs is signaled, information indicating a reference line to which the reference sample for correction belongs may be additionally signaled. In this case, a plurality of reference lines on which the projection is performed may include a reference line used to generate the prediction sample and a reference line to which the reference sample for correction indicated by the signaled information belongs.

Alternatively, in order to reduce complexity, there may be a limit that a reference line used to generate the prediction sample is fixedly used as a reference line to which the reference sample for correction belongs.

Alternatively, a reference line adjacent to a reference line used to generate the prediction sample or a reference line closest to a current block may be set as a reference line to which the reference sample for correction belongs. Here, a reference line adjacent to a reference line used to generate the prediction sample may be determined by adding or subtracting 1 to or from an index of a reference line used to generate the prediction sample.

Alternatively, in terms of an image decoding device, a reference line to which the reference sample for correction belongs may be determined based on a cost of a reference sample at a projected position for each reference line. As an example, a cost may be calculated for each of two reference samples (B, C) specified by performing projection in a reverse direction of a prediction direction in FIG. 16. The cost may be calculated based on a difference between a corresponding reference sample and a prediction sample (A). A reference line corresponding to the smallest cost among the calculated costs may be determined as a reference line to which the reference sample for correction belongs. A reference sample corresponding to the smallest cost may be set as a reference sample for the correction.

A reference sample for correction of the prediction sample may be determined based on a weighted sum of reference samples (e.g., A and B) belonging to the plurality of reference lines. A weight for the weighted sum may be determined based on a cost calculated for each of the above-described reference samples. As an example, a weight applied to a reference sample with the minimum cost may be greater than a weight applied to a reference sample with the maximum cost.

Alternatively, any one of reference samples belonging to the plurality of reference lines may be determined as a reference sample for correction of the prediction sample. To this end, information indicating a position of a reference line to which the reference sample for correction belongs may be signaled. In other words, when the signaled information is a first value, a reference sample (A) belonging to a first reference line may be determined as a reference sample for correction, and when the signaled information is a second value, a reference sample (B) belonging to a second reference line may be determined as a reference sample for correction.

Correction of the prediction sample may be adaptively performed based on information indicating whether a prediction sample is corrected. Here, the information may be encoded in an image encoding device and signaled to an image decoding device. Alternatively, the information may be implicitly derived based on at least one of a size or a shape of a current block, a position of a reference line or a relation with a template region.

Whether to correct a prediction sample may be determined based on a comparison between an intra prediction mode determined in S310 (hereinafter, referred to as a first intra prediction mode) and an intra prediction mode derived based on a template region (hereinafter, referred to as a second intra prediction mode).

Here, a comparison may determine at least one of whether a first intra prediction mode is the same as a second intra prediction mode, whether a mode value difference between a first intra prediction mode and a second intra prediction mode is greater than a predetermined threshold value or whether a difference between an angle of a first intra prediction mode and an angle of a second intra prediction mode is greater than a predetermined threshold value.

As an example, if a first intra prediction mode is the same as a second intra prediction mode, it may be determined that correction of a prediction sample is not performed, and otherwise, it may be determined that correction of a prediction sample is performed.

If a mode value difference between a first intra prediction mode and a second intra prediction mode is greater than a predetermined threshold value, it may be determined that correction of a prediction sample is not performed, and otherwise, it may be determined that correction of a prediction sample is performed.

If a difference between an angle of a first intra prediction mode and an angle of a second intra prediction mode is close to 0 degrees or 180 degrees, it may be determined that correction of a prediction sample is performed. On the other hand, when a difference between an angle of a first intra prediction mode and an angle of a second intra prediction mode is close to 90 degrees, it may be determined that correction of a prediction sample is not performed. If a threshold value is set as 20, it may be determined that correction of a prediction sample is performed when it is within +20 at 0 degrees and 180 degrees, respectively, and otherwise, it may be determined that correction of a prediction sample is not performed.

When a plurality of samples are used to correct a prediction sample, an intra prediction mode may be derived for a region to which each of a plurality of samples belongs, and an intra prediction mode of each region may be compared with an intra prediction mode of a current block.

Reference samples belonging to a plurality of reference lines may be used to correct the prediction sample, and in this case, through the above-described method, an intra prediction mode may be derived per each template region to which a reference sample belongs, and whether to correct a prediction sample may be determined based on the comparison.

A term of syntaxes used in the above-described embodiments is just named for convenience of a description.

When embodiments described based on a decoding process or an encoding process are applied to an encoding process or a decoding process, it is included in a scope of the present disclosure. When embodiments described in predetermined order are changed in order different from a description, it is also included in a scope of the present disclosure.

The above-described embodiment is described based on a series of steps or flow charts, but it does not limit a time series order of the present disclosure and if necessary, it may be performed at the same time or in different order. In addition, each component (e.g., a unit, a module, etc.) configuring a block diagram in the above-described embodiment may be implemented as a hardware device or software and a plurality of components may be combined and implemented as one hardware device or software. The above-described embodiment may be recorded in a computer readable recoding medium by being implemented in a form of a program instruction which may be performed by a variety of computer components. The computer readable recoding medium may include a program instruction, a data file, a data structure, etc. solely or in combination. A hardware device which is specially configured to store and perform magnetic media such as a hard disk, a floppy disk and a magnetic tape, optical recording media such as CD-ROM, DVD, magneto-optical media such as a floptical disk and a program instruction such as ROM, RAM, a flash memory, etc. is included in a computer readable recoding medium. The hardware device may be configured to operate as one or more software modules in order to perform processing according to the present disclosure and vice versa.

The invention claimed is:

1. A method of decoding an image, the method comprising:

determining an intra prediction mode of a current block;

determining one or more reference lines of the current block among a plurality of reference line candidates available for the current block;

generating a prediction sample of the current block based on the intra prediction mode and the one or more reference lines which have been determined; and correcting the generated prediction sample to obtain a corrected prediction sample, wherein in response to the intra prediction mode of the current block being one of pre-defined directional intra prediction modes, the corrected prediction sample is generated based on a difference between two reference samples belonging to the one or more reference lines, and wherein the two reference samples include a first reference sample having a same x-coordinate or y-coordinate as the prediction sample and a second reference sample at a projected position from the first reference sample according to a prediction direction according to the intra prediction mode of the current block.

2. The method of claim 1, wherein in response to the intra prediction mode of the current block being a non-directional mode, the prediction sample is corrected based on at least one of a first difference between the first reference sample having the same x-coordinate as the prediction sample and a reference sample at a reference position and a second difference between the second reference sample having the same y-coordinate as the prediction sample and the reference sample at the reference position.

3. The method of claim 2, wherein the corrected prediction sample is generated based on a weighted sum of the prediction sample, the first difference and the second difference.

4. The method of claim 1, wherein a position of the first reference sample is determined based on the intra prediction mode of the current block.

5. The method of claim 1, wherein the corrected prediction sample is generated based on a weighted sum of the prediction sample and a difference between the two reference samples.

6. The method of claim 5, wherein a weight for the weighted sum is determined based on the intra prediction mode of the current block and a derived intra prediction mode of the current block, the derived intra prediction mode being derived based on a cost calculated from a predetermined template region adjacent to the current block.

7. The method of claim 6, wherein the cost is calculated for each of a plurality of candidate modes belonging to a candidate list of the current block, and wherein, based on the cost of each of the plurality of candidate modes, one of the plurality of candidates modes is determined to be the derived intra prediction mode.

8. The method of claim 1, wherein a plurality of reference lines are used to correct the prediction sample of the current block.

9. The method of claim 8, wherein any one of the plurality of reference lines is a reference line used to generate the prediction sample of the current block, wherein another one of the plurality of reference lines is specified based on information signaled through a bitstream.

10. A method of encoding an image, the method comprising:

determining an intra prediction mode of a current block;

determining one or more reference lines of the current block among a plurality of reference line candidates available for the current block;

generating a prediction sample of the current block based on the intra prediction mode and the one or more reference lines which have been determined; and correcting the generated prediction sample to obtain a corrected prediction sample, wherein in response to the intra prediction mode of the current block being one of pre-defined directional intra prediction modes, the corrected prediction sample is generated based on a difference between two reference samples belonging to the one or more reference lines, and wherein the two reference samples include a first reference sample having a same x-coordinate or y-coordinate as the prediction sample and a second reference sample at a projected position from the first reference sample according to a prediction direction according to the intra prediction mode of the current block.

11. A device for transmitting compressed video data, comprising:

a processor to obtain the compressed video data; and a transmitter to transmit the compressed video data, wherein obtaining the compressed video data comprises:

determining an intra prediction mode of a current block;

determining one or more reference lines of the current block among a plurality of reference line candidates available for the current block;

generating a prediction sample of the current block based on the intra prediction mode and the one or more reference lines which have been determined; and correcting the generated prediction sample to obtain a corrected prediction sample, wherein in response to the intra prediction mode of the current block being one of pre-defined directional intra prediction modes, the corrected prediction sample is generated based on a difference between two reference samples belonging to the one or more reference lines, and wherein the two reference samples include a first reference sample having a same x-coordinate or y-coordinate as the prediction sample and a second reference sample at a projected position from the first reference sample according to a prediction direction according to the intra prediction mode of the current block.

* * * * *